US012239205B2

(12) United States Patent
Dutton et al.

(10) Patent No.: US 12,239,205 B2
(45) Date of Patent: Mar. 4, 2025

(54) SYSTEMS, DEVICES, AND METHODS INCLUDING A MIXING ELEMENT FOR TEMPORARILY MIXING IMMISCIBLE COMPONENTS OF A MULTI-PHASE COMPOSITION

(71) Applicant: L'Oreal, Paris (FR)

(72) Inventors: Simon Nicolas Dutton, Basking Ridge, NJ (US); Michael Robinson, Brooklyn, NY (US)

(73) Assignee: L'Oreal, Paris (FR)

( * ) Notice: Subject to any disclaimer, the term of this patent is extended or adjusted under 35 U.S.C. 154(b) by 660 days.

(21) Appl. No.: 17/491,232

(22) Filed: Sep. 30, 2021

(65) Prior Publication Data

US 2022/0095769 A1 Mar. 31, 2022

Related U.S. Application Data

(60) Provisional application No. 63/085,674, filed on Sep. 30, 2020.

(30) Foreign Application Priority Data

Nov. 3, 2020 (FR) ....................................... 2011245

(51) Int. Cl.

| | |
|---|---|
| ***A45D 34/00*** | (2006.01) |
| ***A45D 34/04*** | (2006.01) |
| ***B01F 31/44*** | (2022.01) |
| ***B01F 35/32*** | (2022.01) |
| *B01F 101/21* | (2022.01) |

(52) U.S. Cl.

CPC ......... *A45D 34/043* (2013.01); *A45D 34/045* (2013.01); *B01F 31/449* (2022.01); *B01F 35/3202* (2022.01); *A45D 2200/058* (2013.01); *B01F 2101/21* (2022.01)

(58) Field of Classification Search

CPC ............ B01F 35/32025; B01F 35/3202; B01F 31/449; B01F 2101/21; A65D 2200/058; A45D 34/045; A45D 2200/058

See application file for complete search history.

(56) References Cited

U.S. PATENT DOCUMENTS

| | | | |
|---|---|---|---|
| 4,984,918 A | 1/1991 | Tizuka et al. | |
| 5,172,992 A | 12/1992 | Ackermann | |
| 6,568,405 B2 * | 5/2003 | Masuyama .......... | A45D 34/046 401/122 |
| 9,211,513 B1 * | 12/2015 | Korpela ............ | B01F 33/50111 |

FOREIGN PATENT DOCUMENTS

| | | |
|---|---|---|
| GB | 981313 | 1/1965 |
| WO | WO2018/190551 | 10/2018 |

* cited by examiner

*Primary Examiner* — Anshu Bhatia

(74) *Attorney, Agent, or Firm* — Christensen O'Connor Johnson Kindness PLLC

(57) ABSTRACT

A multi-phase cosmetic composition mixing pack for mixing immiscible components of a multi-phase cosmetic composition such that they are temporarily miscible includes a container for holding the multi-phase cosmetic composition that has a first open end and a container central axis, and a mixing element disposed within the container and configured to be actuated for mixing immiscible components of the multi-phase cosmetic composition such that they are temporarily miscible, wherein the mixing element is limited to one or more of substantially rotational movement and lateral movement along the container central axis when actuated.

8 Claims, 18 Drawing Sheets

SYSTEMS, DEVICES, AND METHODS INCLUDING A MIXING ELEMENT FOR TEMPORARILY MIXING IMMISCIBLE COMPONENTS OF A MULTI-PHASE COMPOSITION

CROSS-REFERENCES TO RELATED APPLICATIONS

This application claims the benefit of U.S. Provisional Application No. 63/085,674, filed Sep. 30, 2020, and French Application No. 2011245, filed Nov. 3, 2020, the disclosures of which are expressly incorporated herein by reference in their entirety.

SUMMARY

In an aspect, the present disclosure is directed to, among other things, a multi-phase cosmetic composition mixing pack including a mixing element configured to mix immiscible components of a multi-phase cosmetic composition such that they are temporarily miscible. In an embodiment, the mixing element is disposed within the container and comprises one or more structures that impart rotational and lateral movement along the container central axis when actuated. In an embodiment the mixing pack includes a container for holding the multi-phase cosmetic composition that has a first open end and a container center axis.

In an embodiment, the mixing element comprises a cylindrical collar and one or more mixing blades extending longitudinally therefrom. In an embodiment, the one or more mixing blades have alternating blade widths extending along the one or more mixing blades. The one or more mixing blades may have one or more alternating blade angles extending along the one or more mixing blades. The one or more mixing blades may comprise face walls and shallow side walls, wherein the one or more mixing blades are attached to the collar along a portion of the shallow side walls and the face walls are substantially perpendicular to the collar.

In an embodiment, the one or more mixing blades are substantially straight. In an embodiment, the one or more mixing blades comprise a distal end having an angled end portion. The one or more mixing blades may comprise one or more notches. The one or more mixing blades may comprise one or more ribbons. The one or more mixing blades may comprise at least one curve or arch. In one embodiment, the one or more mixing blades are generally helically shaped and patterned.

In an embodiment, the container comprises a first end with an opening attached to an end cap assembly with a rotating drive shaft operable to substantially rotate the mixing element along the central axis.

Another embodiment provides that the container comprises a second end that comprises one or more haptic cams or protrusions.

Yet another embodiment provides that the mixing element comprises one or more mixing blades attached to a bottom base plate and fanning out therefrom alternately arranged with one or more mixing blades attached to a top collar and the bottom base plate, and wherein the mixing element is in mechanical communication with a drive shaft operable to substantially rotate the one or more mixing blades around the central axis.

In an embodiment, the mixing element comprises one or more mixing blades attached to a collar base in fluid communication with a motor.

In an embodiment, an actuator end cap assembly is provided in communication with the collar to compress or fold and expand or unfold the one or more mixing blades.

In an embodiment, a flexible cap assembly having removable attachment to said mixing element, wherein the mixing element comprises an applicator stem of an applicator for applying the temporarily miscible components of the multi-phase cosmetic composition to a keratinous material, and wherein movement is actuated by moving the applicator stem back and forth.

In an embodiment, the mixing pack further comprises an applicator for applying the temporarily miscible components of the multi-phase cosmetic composition to a keratinous material, the applicator comprising an applicator portion on a distal end of a stem.

In an embodiment, the mixing element has a patterned surface to increase wettability.

In an aspect, the present disclosure is directed to, among other things, a multi-phase cosmetic composition container including a mechanical blender including a plurality of mixing elements disposed about an applicator received within a container reservoir that is at least partially filled with a multi-phase cosmetic composition. In an embodiment, the multi-phase cosmetic composition container includes a torque component operably coupled to the mechanical blender, the torque component including a rotational end cap assembly that affixes to the multi-phase cosmetic composition container and engages the mechanical blender so as to rotate or oscillate the plurality of mixing elements responsive to an applied a rotational force. In an embodiment, the multi-phase cosmetic composition container includes the torque component is configured to rotate the mixing element along a central axis for a duration and rate sufficient to mix immiscible components of a multi-phase cosmetic composition such that they are temporarily miscible, elements responsive to an applied a rotational force, without contacting the application portion of the applicator received within a container reservoir. In an embodiment, the plurality of mixing elements comprises a plurality of blades, each blade having a cross-section having a regular or irregular geometric shape.

In an embodiment, each of the plurality of mixing elements comprises a unique cross-section. In an embodiment, each of the plurality of mixing elements comprises a ribbon or helical structure.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
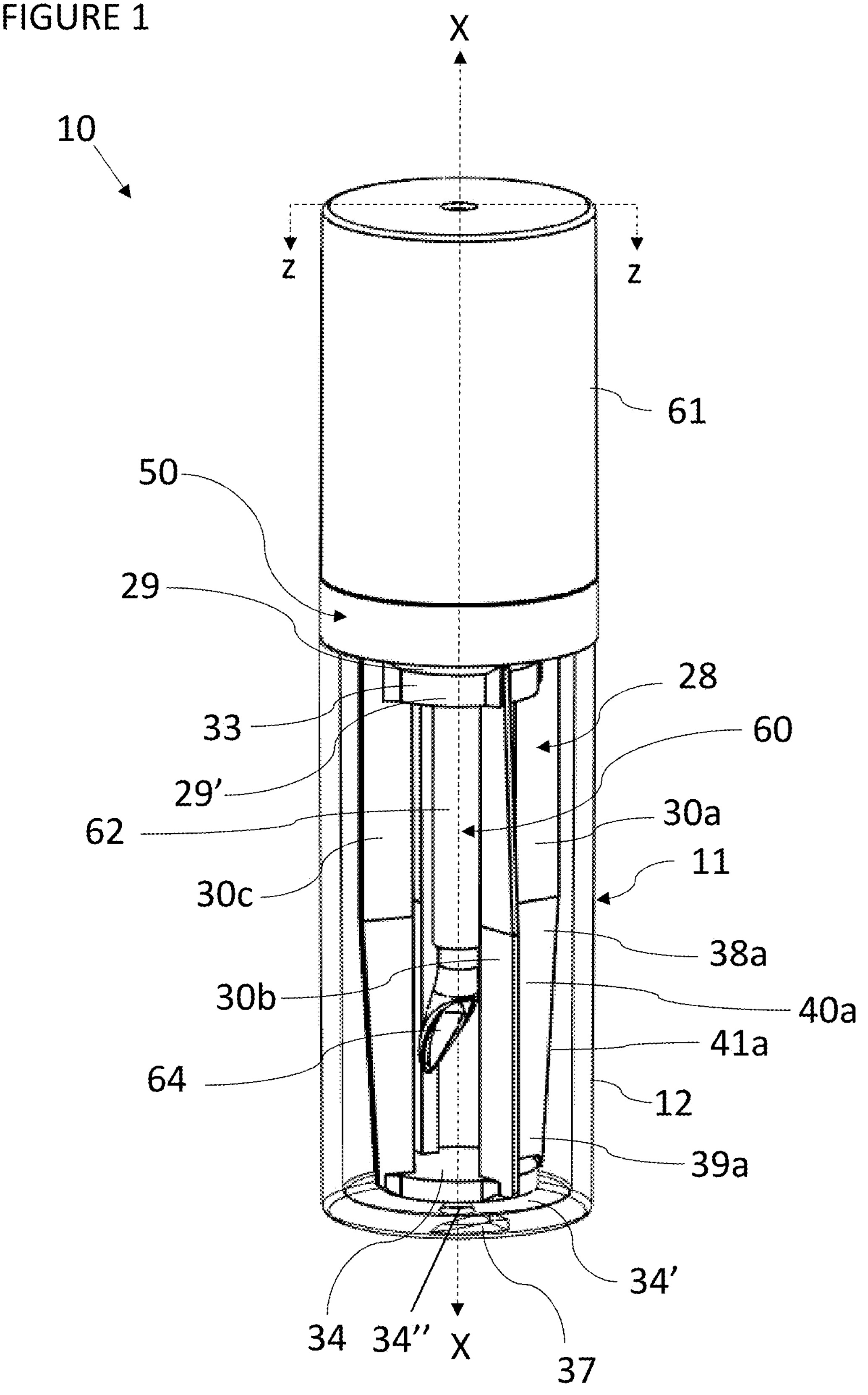
FIG. 1 is an isometric view of a mixing pack formed in accordance with a first exemplary embodiment of the present disclosure, wherein the mixing pack includes a mixing element.
Figure 2:
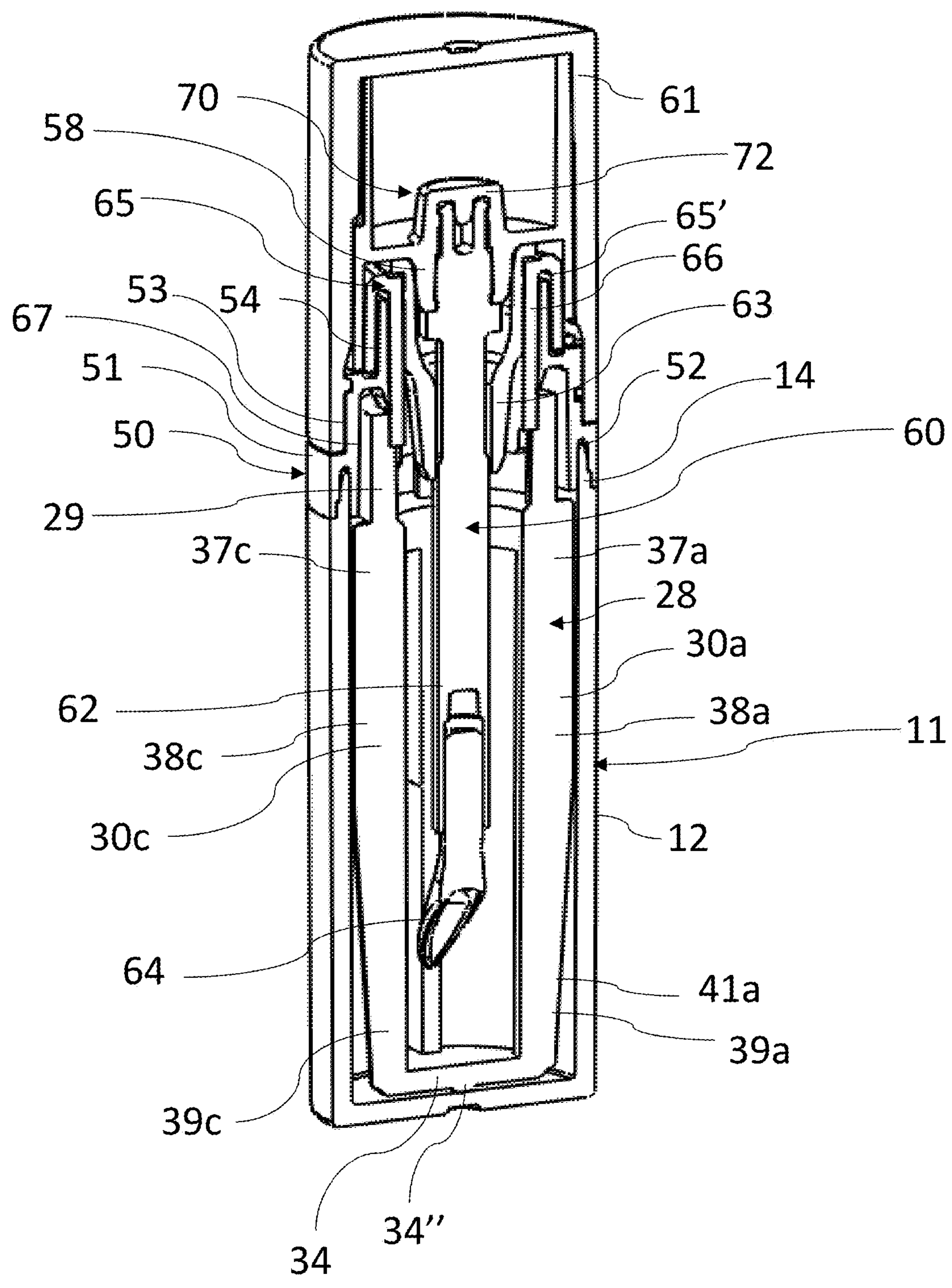
FIG. 2 illustrates a cross-sectional view of the mixing pack of FIG. 1 taken along cross-section z.
Figure 3:
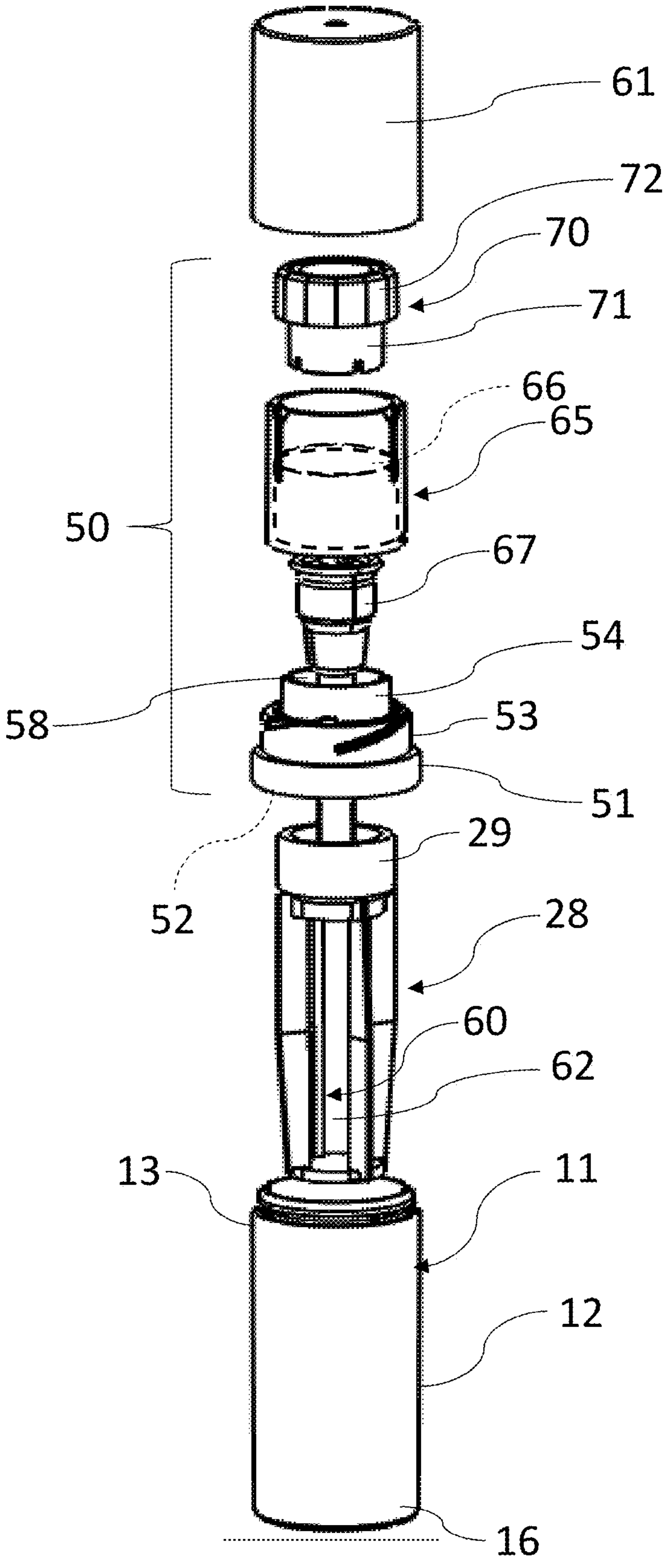
FIG. 3 illustrates an exploded view of the mixing pack of FIG. 1.
Figure 4:
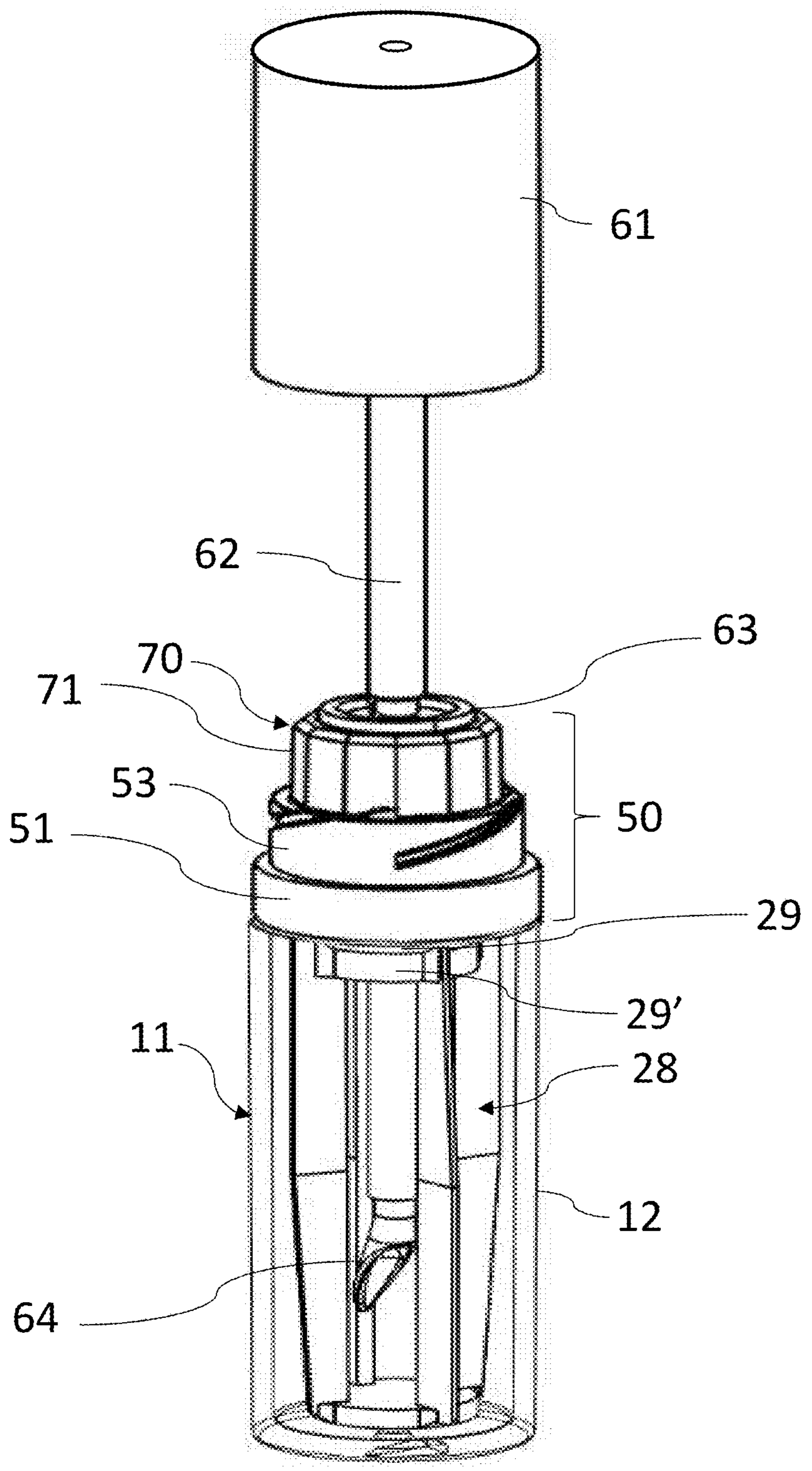
FIG. 4 illustrates an isometric view of FIG. 1 with the applicator top/cap in the open configuration, such as prior to application.

Many cosmetic compositions, including pigmented cosmetics such as foundations and lipsticks, have been formulated in an attempt to possess longwearing properties upon application. Unfortunately, many of these compositions do not generally possess both good long-wear/transfer-resistance properties as well as good application properties, good comfort properties and/or good appearance properties (for example, shine, gloss or matte properties).

For example, with respect to lip products, commercial products containing silicon resins such as MQ resins are known. Such products are known to provide good long wear properties and/or transfer-resistance. However, such products possess poor application properties, poor feel upon application (for example, feel rough) and poor shine or gloss properties owing to the film formed by the MQ resin (for example, a matte appearance). Therefore, a second composition (topcoat) is separately applied to such products to improve poor properties of the compositions to make the products acceptable to consumers. Furthermore, the topcoat composition must be reapplied continually so that the product remains acceptable to consumers, meaning that the products are effectively not "long-wearing" as they require constant maintenance and reapplication.

Also, with respect to foundations, such products can provide good long wear properties and/or transfer-resistance. However, such long-wearing/transfer-resistant products can possess poor application and/or feel upon properties application, as well as poor matte properties.

"Single step" multi-phase cosmetic compositions having improved cosmetic properties, particularly good wear, feel, shine, gloss and/or matte characteristics upon application are described in U.S. patent application Ser. No. 15/144,716, entitled "Lip Compositions," filed on May 2, 2016, with the inventor Rita El-Khouri, U.S. patent application Ser. No. 15/144,622, entitled "Liquid Lipstick Compositions Capable of Forming a Multilayer Structure After Application to Lips," filed on May 2, 2016, with the inventor Rita El-Khouri, U.S. patent application Ser. No. 15/144,698 entitled "Lip Compositions Capable of Forming a Multilayer Structure After Application to Lips," filed on May 2, 2016, with the inventor Rita El-Khouri, U.S. Provisional Patent Application No. 62/316,309, entitled "Cosmetic Compositions Capable of Forming a Multilayer Structure After Application to a Keratinous Material," filed on Mar. 31, 2016, with the inventor Rita El-Khouri, and Patent Cooperation Treaty (PCT) Application No. PCT/US2017/025370, titled "Cosmetic Compositions Capable of Forming a Multilayer Structure After Application to Keratinous Material," filed on Mar. 31, 2017, with the inventor Rita El-Khouri, the disclosures of which are incorporated by reference herein in their entirety.

The above-referenced applications disclose, for example, a multi-phase cosmetic composition for keratinous materials (for example, skin, hair, eyelashes, nails, or lips) which has good cosmetic properties such as, for example, good adhesion, transfer-resistance, feel, gloss (or shine), and/or matte upon application, and which can be applied to a keratinous material without having to engage in a multi-step application process. More specifically, the above-referenced applications disclose multi-phase cosmetic compositions that comprise at least two immiscible components prior to application and that are capable of forming a multilayer structure after application to a keratinous material. Such multi-phase cosmetic compositions allow for benefits associated with multi-layer cosmetic products without having to engage in a multi-step application process.

Immiscibility of the immiscible components can result from an incompatibility between the two components when the composition is at rest, an incompatibility between the two components after application to a keratinous material, or both. When the immiscible components result from an incompatibility between the two components when the composition is at rest, i.e., in a cosmetic container, the immiscible components must be appropriately mixed prior to application of the multi-phase cosmetic composition to the keratinous material. Once appropriately mixed, the multi-phase cosmetic composition comprising the temporarily miscible components can be applied to the keratinous material. After application to the keratinous material, the components separate to form a multilayer structure on the keratinous material.

In an aspect, technologies and methodologies include a mixing pack that can be used for mixing a multi-phase cosmetic composition so that the immiscible components are temporarily miscible. For purposes of this detailed description, the term "mixing" (or like versions, such as "mixer", "mix", or "mixed") shall be interpreted to include any suitable mixing, blending, churning, emulsifying, etc., of a multi-phase cosmetic composition so that the immiscible components are temporarily miscible.

A package system for multi-phase cosmetic that requires mixing or re-mixing before application is provided. The subject mix pack enables a user experience which allows consumers to pre-mix a multi-phase formulation, prior to application to deliver maximum performance of the multi-phase formulation. Multi-phase cosmetics contemplated include for non-limiting example, long wear shine lip gloss and lip stick that utilize phase separated film formers providing adhesion and transfer resistant wear of color. However, phase separation requires mixing prior to use to ensure even application of both phases. During application mixing is achieved through use of the mixing pack, and the mixed composition can be applied to the lip surface for even distribution. Once on the lip surface, the composition re-undergoes phase separation on the lip, for example providing long wear color that adheres to the lip surface such as via silicon film formers, with a sealing gloss formed from oil phase.

In a first embodiment, a mechanical stirring assembly is provided which rotates and mixes, stirs, and agitates formula to generate a more homogenized state. This enables a high-performance formula to be delivered, one that has performance level because of its instability which requires mixing into a homogeneous state before applying. Current package solution is heavy, higher material cost, and more challenging to environmental standards/goals. The subject mixing pack engages the consumer to be a part of the product experience, and may include cues like a haptic, sound, that conveys the functionality of the mixing pack. Various mix positions may be provided that allows for an end cap assembly to engage a specified location or mix position.

Turning now to FIGS. 1-6, there is shown a first exemplary embodiment of a mixing pack 10 suitable for mixing a multi-phase cosmetic composition (not shown) so that the immiscible components are temporarily miscible. The mixing pack 10 generally includes a container 11 for holding a multi-phase cosmetic composition, a mixing element 28 for mixing the multi-phase cosmetic composition, and an applicator 60 for applying the temporarily miscible components of the multi-phase cosmetic composition to a keratinous material.

Container 11 may be any suitable shape, size, configuration, material, etc., to appropriately hold a desired multi-phase cosmetic composition. In the depicted embodiment, the container 11 includes a substantially cylinder glass or plastic container body 12, having a first end 13 having a rim 14 surrounding an opening 15 forming a top of container 11 and a second end 16 that is enclosed to form the bottom of container 11. The first end 13, or top of the container 11, opening 15 is attached, either removably or fixedly, to an end cap assembly 50 that may be press-fit or otherwise secured to or within opening 15 of the first end 13 of container 11 in any suitable manner.

In the subject embodiment, the second (or bottom) end 16 is enclosed, and the first (or top) end 13 is attached, removably or fixed, to the end cap assembly 50 at rim 14. End cap assembly 50 encloses and seals opening 15 of first end 13 of the container body 12 and provides an interface between the applicator 60 and the interior of the container 11.

End cap assembly 50 includes a bottle shoulder 51 having a shoulder collar 53 which in turn is attached to a secondary shoulder collar 54, in a stacked cylindrical arrangement with an aligned central opening 58 for pass through of applicator 60. Bottle shoulder 51 includes an internal shoulder tract 52 that receives rim 14 of first end 13 of bottle 11 for connection to bottle 11 (preferably fixedly, but alternatively removably). Shoulder collar 53 includes external threads, grooves, or snap fittings for attachment to applicator top 61 (applicator cap).

In an embodiment, an inner cap 65 having a rotating inner stem/drive shaft 66 and O-ring seal 65' surrounding an inner cap opening for pass-through of the applicator 60 is received on secondary shoulder collar 54. At least a portion of inner cap 65 is secured within bottle shoulder 51 and includes rotating inner stem/drive shaft 66 that forms a channel 67 with secondary shoulder collar 54 that provides attachment to collar 29 of mixing element 28. The inner cap 65 and shoulder 51 may be formed as a unilateral, single unit. Rotating inner stem/drive shaft 66 includes grooves or tracts that receive mating grooves or tracks of a drive collar 70 so that as drive collar 70 is rotated, rotating inner stem/drive shaft 66 rotates in unison, in turn rotating mixing element 28.

Drive collar 70 is formed having a drive stem 71 that includes the mating grooves or tracts, and a drive turn 72 that is adapted to securely fit within applicator top/cap 61 for rotation after the applicator top/cap 61 is unscrewed or unconnected from shoulder collar 53 and manually rotated by a user to rotate cap 61, drive turner 72, drive shaft 66 and mixing element 28. Alternatively, cap 61 may be removed and the user may grasp drive turn 72 directly to manually rotate the mixing element 28 to mix the phase-separated liquid or solution within bottle 11. As a result, mixing element 28 is limited to rotational movement along a central axis x-x. Drive collar 70 may be part of mixing element, and/or cap assembly formed or as separate assembled elements.

In that regard, the end cap assembly 50 includes central opening 58 extending from a top surface to a bottom surface of the first end cap assembly 50 and rotating inner stem/drive shaft 66 and drive collar 70. The central opening 58 is sized to allow the applicator 60 to pass there through, which in the depicted embodiment includes a stem 62 and applicator portion or tip 64 defined at the distal end thereof. The stem 62 may pass through the central opening 58 and extend into the container body 12 to position the tip 64 within the interior of the container body 12 for withdrawing the multi-phase cosmetic composition for application to a keratinous material. The end cap assembly 50 may include an internal wiping assembly/wiper 63 that helps wipe excess cosmetic composition from the applicator tip 64 as it is removed from the container body 12. Any suitable internal wiping assembly for the intended application may be used.

The stem 62 of the applicator 60 extends from an interior portion of a cap/applicator top 61 that is removably securable to the shoulder collar 53 on the container 11 for sealing and enclosing the cosmetic composition therein. The cap/applicator top 61 may be removably secured to the top end of the container body 12 in any suitable manner, such as by threading, a snap-fit, friction fit, or otherwise.

It should be appreciated that the container 11 may instead be comprised of a container body that is integrally formed with the end cap assembly 50. Moreover, the container body 12 and the end cap assembly 50 may be formed from any suitable material in any suitable manner. For instance, the container body 12 and end cap assembly 50 may be integrally or separately formed by injection molding. In an embodiment, the container body 12 is molded to molded to have a plug in the bottom end. Furthermore, any other suitable container body 12, cap/applicator top 61 and applicator 60 may be used for the desired application. For instance, the container may be configured to suit the intended use, for example, lip gloss, foundation, concealer, lacquer, etc.

An exemplary mixing element 28 suitable for mixing the multi-phase cosmetic composition contained within the container 11 will now be described. In the embodiment depicted in FIGS. 1-6, the mixing element 28 is embodied as having a plurality of mixing blades or paddles made from a suitable material that is inert in the multi-phase composition. In an embodiments, mixing element 28 comprise flexibilities ranging from very rigid to flexible enough to bend over Cams/ribbons but rigid enough/material memory enough to snap back into position with enough vigor as to cause shock to additionally agitate and mix composition.

Mixing element 28 is constructed having a collar 29 having one or more mixing blades, herein shown as a plurality of mixing blades 30*a*, 30*b*, 30*c*, 30*d*, extending longitudinally therefrom. Collar 29 is formed as a cylindrical ring or band having a diameter x. Preferably, collar 29 extends toward a minor collar 29' having a smaller diameter, diameter mc that is ≤than diameter x of collar 29. Preferably, diameter mc is <than diameter x so that minor collar 29' is diametrically in-set from collar 29.

Collar 29 provides a larger diameter x "mix axis" that allows great accessibility for all user types and mixing elements. Additionally, a differential gear in the inner cap may be provided that would allow for specifying revolutions per turn/ratios for optimal mixing rate to formula. Visually, the consumer can see the formula transform into a homogeneous uniform formula from a separated two-part formula, through a clear pack, also seeing the mixing paddles, and application of the formula. Due to the modularity, the mixing element blades or paddles, readily incorporate coatings, and material attributes (hydrophilic/hydrophobic) into the mixture for application.

The stem 62 and tip 64 of the applicator 60 may extend through the collar 29 and minor collar 29' and centrally into the mixing element 28 positioned within the container 11 such that the mixing element 28 at least partially surrounds the applicator stem 62 and tip 64. The mixing element 28 is appointed to move rotate axially along the side walls of the body 12 of container 11, rotating axially along center line X-X. Mixing blades 30*a*, 30*b*, 30*c*, 30*d* are herein shown as four blades, but notably mixing blades may be 30n+1, and may include for example 4, 6, 8, 10, 12, 14, 16, and/20 mixing blades. Mixing blades 30*a*-30*d* are formed as elongated blades having a proximal end 37*a*-37*d*, extending to a blade body 38*a*-38*d*, in turn extending to a distal end 39*a*-39*d*, face walls 40*a*-40*d* and shallow substantially perpendicular side walls 41*a*-41*d*. Proximal end 37*a*-37*d* of mixing blades 30*a*-30*d* may be attached to, and, extending vertically or longitudinally from a rim 32 of collar 29 and from side wall 33 of minor collar 29', as shown, abutting along a portion of side walls 41*a*-41*d* so that face walls 40*a*-40*d* are substantially perpendicular to collar 29 and minor collar 29'. Mixing blades 30*a*-30*d* are preferably spaced equal distance from one another along collar 29 and minor collar 29' attached at proximal end 37*a*-37*d*.

Distal end 39 of mixing blades 30*a*-30*d* preferably terminate at base plate 34, attached thereto. Base plate 34 is adapted to be proximal to bottom or second end 16 of container 11, above and not contacting bottom or second end 16 of container 11 to leave a gap 34' there between for liquid flow. Base plate 34 may include one or more cams or projections 37 for upward force, preferably molded on second end 16 in the interior of bottle 11, projecting upwardly into gap 34' space for providing enhanced turbulence. Cams or projections 37 make sliding contact with the bottom of base plate 34 while mixing element 28 is rotating to impart reciprocal or variable motion to mixing element 28 and sound or haptics and/or clicking. Reciprocal or variable motion results as the mixing element 28 rapidly slides or strikes the one or more cams or projections 37 causing the rotational movement of the mixing element 28 to simultaneously bump or bounce upward, causing turbulence. Bottom wall 16 of container 11 may have the cams, ridges or projections 37 integrated or molded therein, or alternatively a thin bottom mix plate with one or more upward extending cams, ridges or projections (not shown) may be fixedly mounted on second end 16 of container 11 for providing enhanced turbulence and undercurrent mixing in gap 34' space, as well as haptic sensory to the user, including for force and/or clicking sound. Cams or projections 37 act to push the blades up and down during rotation or disrupt the rotation for abrupt movement along the rotational path. Alternatively, instead of pushing the blades up it causes deformation of the blades, and haptic or snapping sound. Agitation may be controlled by flexibility of mixing blade material. For example, the mixing blades may be formed of a more rigid material, or more flexible material yet sufficient to sear the multi-phase composition, and/or a combination of materials, bi-injected materials, formed by methods including, for example bi-injection molding. A bottom center point projection 34" may be provided at the bottom center point under base plate 34 of the mixing element 28, which in turn contacts and rests within a mating divot on bottom/second end 13 of container 11 to provide rotational stabilization.

Proximal end 37*a*-37*d*, blade body 38*a*-38*d* and distal end 39*a*-39*d* preferably have varying widths. Preferably, mixing blades 30*a*-30*d* are alternately arranged with mixing blades 30*a*, 30*c* having proximal end 37*a*, 37*c* with a wider width than the distal end 39*a*, 39*c*, gradually lessoning through blade body 38*a*, 38*c*. Alternatingly, mixing blades 30*b*, 30*d* proximal end 37*b*, 37*d* width less than the distal end 39*b*, 39*d*, so that the width from the proximal end 37*b*, 37*d* gradually widens through the blade body 38*b*, 38*d* extending toward the wider distal end 39*b*, 39*d*. In this alternating blade width arrangement, the mixing blades 30*a*, 30*c* propel against the liquid mixed by mixing blades 30*b*, 30*d* causing enhanced mixing. Blade body 38*a*-38*d* width may be >than both proximal and distal ends 37*a-d*, 39*a-d* to form a wider surface area along the blade body 38*a*-38*d* for wiping near the side walls of container 11. Alternatively, the one or more mixing blades may have, alone or in conjunction with alternating widths, alternating blade angles extending along the one or more mixing blades. In this manner, shallow side walls 41*a*-41*d* may be angled in relation to the central axis.

The container 11 is suitably sized and shaped to enclose the mixing element 28 (or the mixing element 28 is sized to fit within the container 11) such that when the mixing element 28 is actuated (i.e., rotated), the multi-phase cosmetic composition contained within the container 11 is appropriately mixed. In that regard, the mixing element 28 has a length that generally extends along a portion of the length of the container body 12, such as three-quarters (¾) of the container body length. In that manner, the mixing element 28 may rotate along the central axis of the bottle/container 11 moving the multi-phase cosmetic in layer motions setting in motion other adjacent layers to turn and move the liquid to form a mixture for direct application onto the keratinous surface, which composition then separates back out on the surface to provide in depth/layered cosmetic application.

Owing to the alternating angles of the propeller blades, the formula oscillates in a parabolic pattern, not only radially, as shown by way of formula oscillation through propeller or blades as shown at 28'. The immiscible components flow around the mixing blades of the mixing element and flows against the walls of the body 12 of container 11, flowing through and centrifugally against the blades, body 12 and moving and folding and oscillating adjacent layers. In that regard, suitable paddle, or blade geometry, including elongated paddles, helical geometries are contemplated to be used for the intended application. For instance, a low viscosity multi-phase cosmetic composition may be sufficiently mixed with a blade geometry having thinner blades, but more in number, and/or a helix having lower pitch helix design, wherein a higher viscosity multi-phase cosmetic composition may require a blade geometry having wider blades, and/or a helix geometry having a higher pitch helix design to sufficiently mix the immiscible components.

It can be appreciated that the rotational mixing element configuration will be dependent on the intended application of the mixing pack. Accordingly, the descriptions and illustrations provided herein should not be seen as limiting. Additional vertical movement may further be provided with notching and cam arrangement of the mixing blades (as shown in FIGS. 7A-7F). Alternating notches move the formula vertically, in addition to rotational movement of the mixing blades. Furthermore, the bottle may be held at an angle, approximately 45 degrees, when engaging the mixing element to further enhance mixing of the multi-phase composition.

Figure 5:
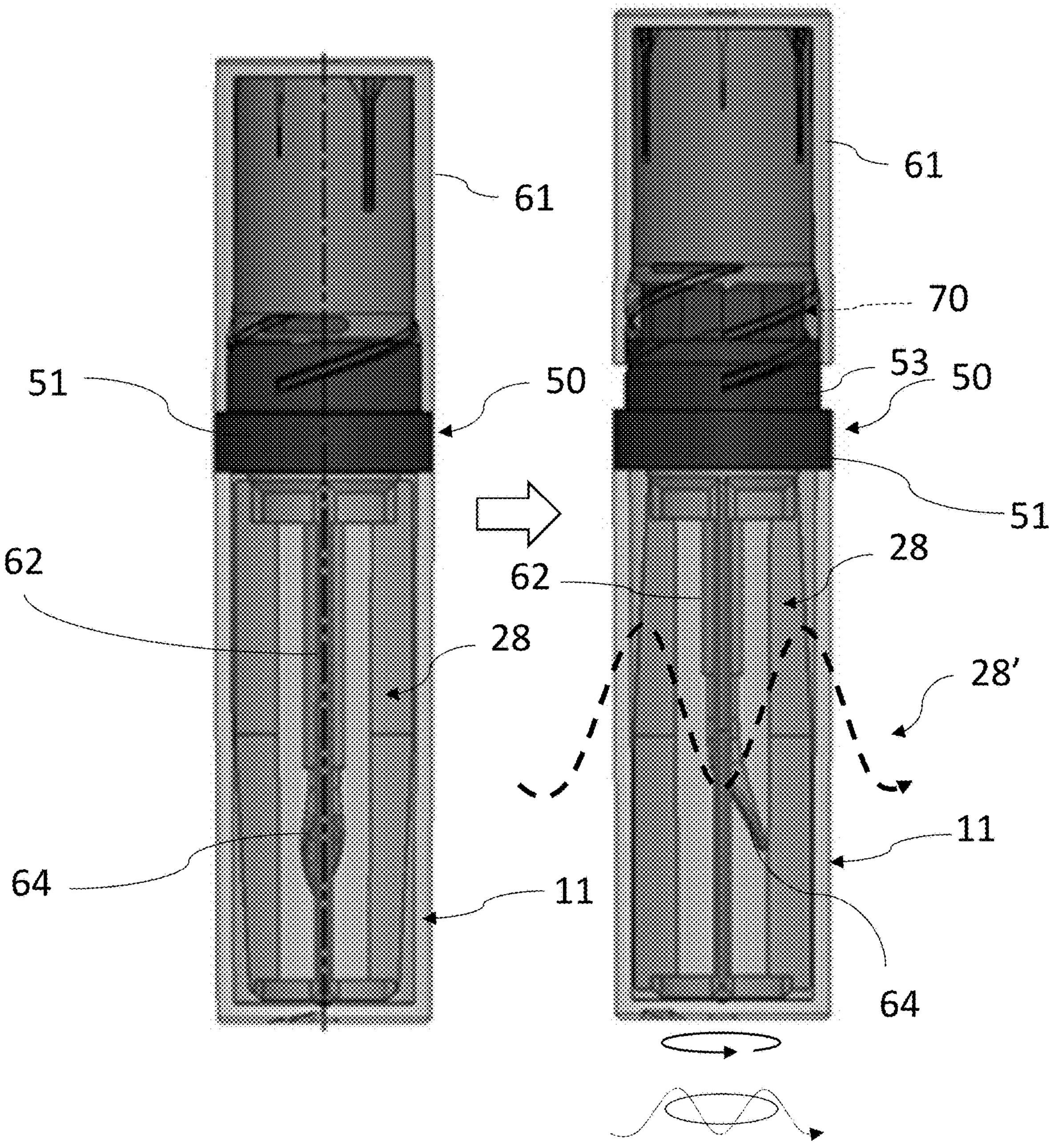
FIG. 5 illustrates closed and open mix configurations of the mixing pack of FIG. 1.
Figure 6:
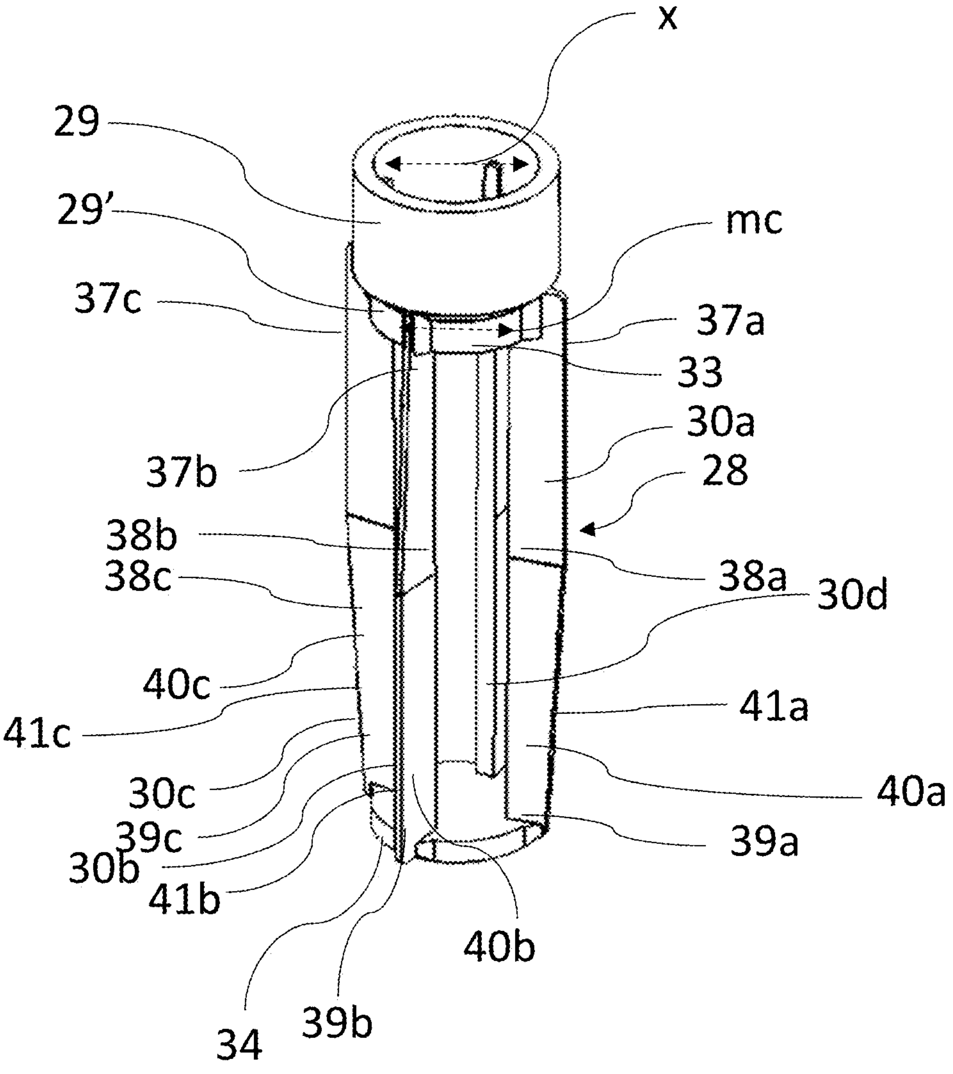
FIG. 6 is an isometric view of the mixing element of FIG. 1.

Referring to FIG. 5, in an embodiment, a multi-phase cosmetic composition container comprises a mechanical blender including a plurality of mixing elements 28 disposed about an applicator received within a container reservoir that is at least partially filled with a multi-phase cosmetic composition. In an embodiment, the multi-phase cosmetic composition container includes a torque component operably coupled to the mechanical blender, the torque component including a rotational end cap assembly that affixes to the multi-phase cosmetic composition container and engages the mechanical blender so as to rotate or oscillate the plurality of mixing elements responsive to an applied a rotational force. In an embodiment, the multi-phase cosmetic composition container includes the torque component is configured to rotate the mixing element along a central axis for a duration and rate sufficient to mix immiscible components of a multi-phase cosmetic composition such that they are temporarily miscible, elements responsive to an applied a rotational force, without contacting the application portion of the applicator received within a container reservoir. In an embodiment, the plurality of mixing elements 28 comprises a plurality of blades, each blade having a cross-section having a regular or irregular geometric shape. In an embodiment, each of the plurality of mixing elements 28 comprises a unique cross-section. In an embodiment, each of the plurality of mixing elements comprises a ribbon or helical structure.

In an embodiment, a multi-phase cosmetic composition container includes a mechanical blender including a plurality of mixing elements disposed about an applicator received within a container reservoir that is at least partially filled with a multi-phase cosmetic composition. In an embodiment, the torque component is operably coupled to the mechanical blender. In an embodiment, the torque component includes a rotational end cap assembly that affixes to the multi-phase cosmetic composition container and engages the mechanical blender so as to rotate or oscillate the plurality of mixing elements responsive to an applied a rotational force.

In an embodiment, the torque component is configured to rotate the mixing element along a central axis for a duration and rate sufficient to mix immiscible components of a multi-phase cosmetic composition such that they are temporarily miscible, elements responsive to an applied a rotational force, without contacting the application portion of the applicator received within a container reservoir.

In an embodiment, the plurality of mixing elements comprises a plurality of blades, each blade having a cross-section having a regular or irregular geometric shape. In an embodiment, each of the plurality of mixing elements comprises a unique cross-section. In an embodiment, each of the plurality of mixing elements comprises a ribbon or helical structure.

In an embodiment, the torque component comprises a planetary gear assembly. In an embodiment, the planetary gear assembly includes at least a sun gear, a plurality of planet gears, and a ring gear. In an embodiment, one or more of the plurality of planet gears is coupled to a mixing element and configured to rotate the mixing element in the presence of an applied force. In an embodiment, each of the plurality of mixing elements independently spins about respective longitudinal axis. In an embodiment, the sun gear is coupled to the applicator and configured to transmits torque to the planet gears in the presence of an applied force.

In an embodiment, the planetary gear assembly forms part of the end cap assembly 50 and is driven by drive collar 70. In an embodiment, the planetary gear assembly is operably coupled the applicator stem 62 and driven by a rotation motion of the applicator stem. In an embodiment, the planetary gear assembly is operably coupled the applicator stem 62 via an interlocking geometry coupling.

In one embodiment, the torque component comprises a planetary gear assembly operably coupled to the mechanical blender and configured to rotate each of the plurality of mixing elements in the presence of an applied force.

In an embodiment, the sun gear is located at the center and transmits torque to the planet gears which are typically mounted on a moveable carrier In an embodiment, during operation the planet gears orbit around the sun gear and mesh with an outer ring gear.

FIGS. 7A-7F illustrate various alternative exemplary embodiments of a mixing element 128, 228, 328, 428, 528 and 628 suitable for mixing a multi-phase cosmetic composition contained within the container 11 or any other suitable container. Each mixing element 128, 228, 328, 428, 528 and 628 is made from a suitable material, such as metal, and is of a suitable length and nominal diameter for mixing a multi-phase cosmetic composition in a desired container. Moreover, the characteristics of each mixing element 128, 228, 328, 428, 528 and 628 are clearly shown in FIGS. 7A-7F, respectively, accordingly, the characteristics of each mixing element will be only briefly described.

Figure 7A:
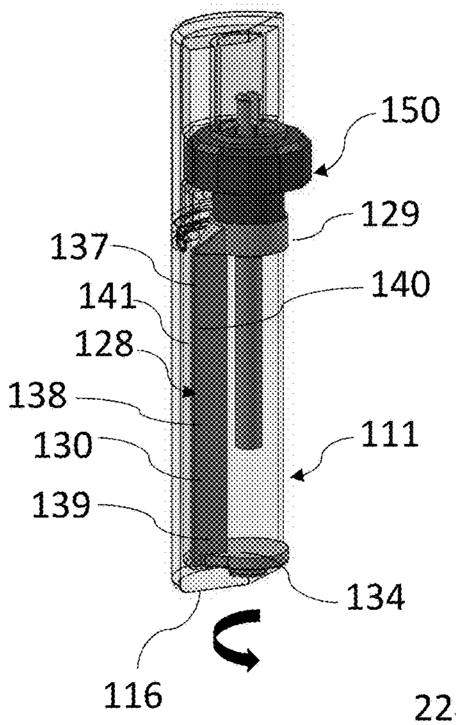
FIG. 7A illustrates an embodiment of the mixing element.

Referring to FIG. 7A, the mixing element 128 is formed having a collar 129 with single mixing blade 130 extending longitudinally therefrom. Collar 129 is formed as a cylindrical ring or band and is appointed for attachment in the assembly discussed hereinabove, with rotational end cap assembly 150. Mixing blade 130 is formed as an elongated straight blade having a proximal end 137, blade body 138 and distal end 139, face walls 140 and shallow substantially perpendicular side walls 141. Proximal end 137 is attached along a portion of perpendicular side walls 141 and extends vertically or longitudinally from collar 129 with face walls

140 being substantially perpendicular to collar 129. Distal end 139 terminates at base plate 134 adapted to be above and proximal to bottom 116 of container 111.

Figure 7B:
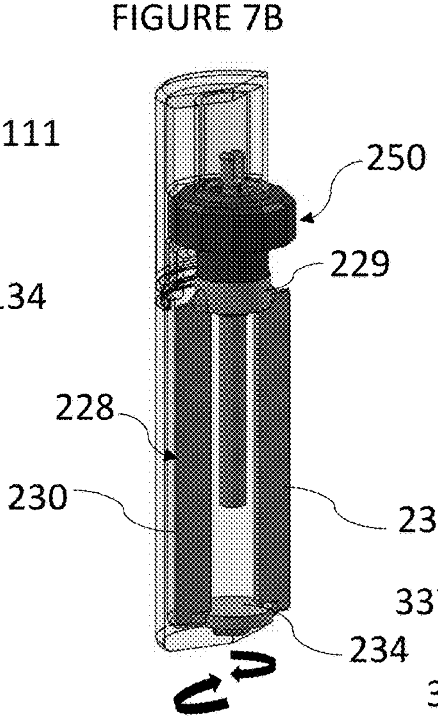
FIG. 7B illustrates an embodiment of the mixing element.

FIG. 7B illustrates a dual straight paddle configuration. In this embodiment the mixing element 228 is formed having a collar 229 with dual mixing blades 230 extending longitudinally therefrom. Collar 229 is formed as a cylindrical ring or band and is appointed for attachment in the assembly discussed hereinabove, with rotational end cap assembly 250. Mixing blades 230 are formed as elongated straight blades arranged as discussed hereinabove, terminating at base plate 234.

Figure 7C:
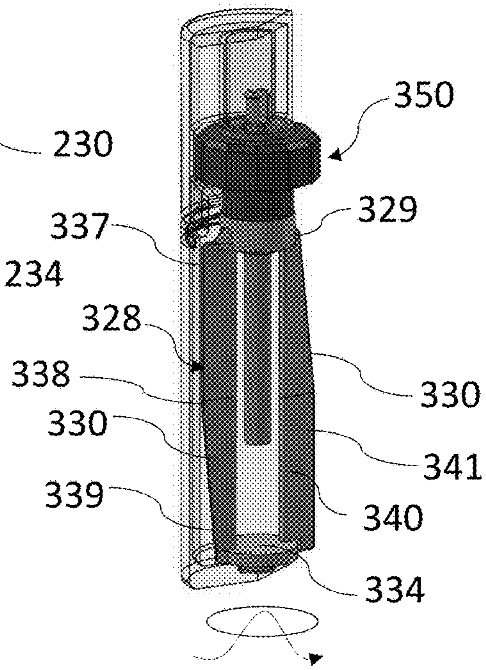
FIG. 7C illustrates an embodiment of the mixing element.

FIG. 7C illustrates a dual prop paddle. In this embodiment the mixing element 328 is formed having a collar 329 with dual mixing blades 330 extending longitudinally therefrom. Collar 329 is formed as a cylindrical ring or band and is appointed for attachment in the assembly discussed hereinabove, with rotational end cap assembly 350. Mixing blades 330 are formed as elongated angled blades with alternating angles/blade widths, terminating at base plate 334. Mixing blades 330 have a proximal end 337, blade body 338 and distal end 339, face walls 340 and shallow substantially perpendicular side walls 341. Angled/alternating blade widths with proximal end 337 being wider on one blade 330, followed by distal end 339 being wider on the other blade 330 providing for oscillating and circular motion of the liquid.

Figure 7D:
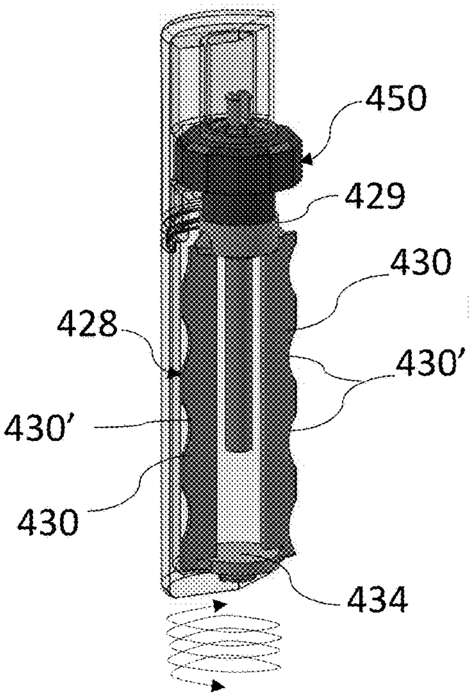
FIG. 7D illustrates an embodiment of the mixing element.

FIG. 7D illustrates a dual notched straight paddle. Mixing element 428 is formed having a collar 429 with dual mixing blades 430 extending longitudinally therefrom. Collar 429 is formed as a cylindrical ring or band and is appointed for attachment in the assembly discussed hereinabove, with rotational end cap assembly 450. Mixing blades 430 are formed as elongated straight blades with one or more notches 430', terminating at base plate 434. Owing to the dual blades 430 and notches 430' the liquid is moved in a spiral rotational pattern during mixing.

Figure 7E:
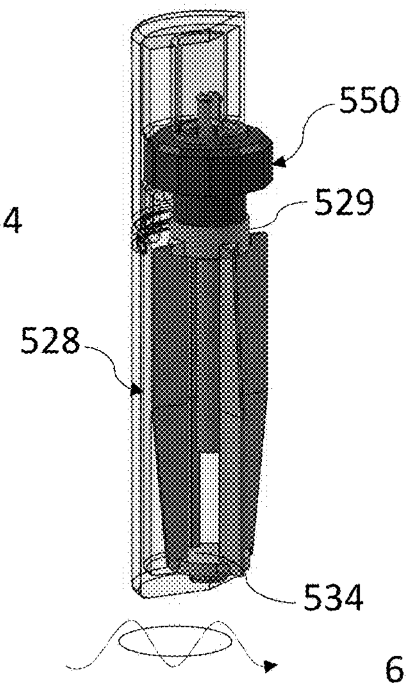
FIG. 7E illustrates an embodiment of the mixing element.

FIG. 7E illustrates a quad (3) prop paddle. Mixing element 528 is formed having a collar 529 with three/quad mixing blades 530 extending longitudinally therefrom. Collar 529 is formed as a cylindrical ring or band and is appointed for attachment in the assembly discussed hereinabove, with rotational end cap assembly 550. Mixing blades 530 are formed as elongated angled blades with alternating angles/blade widths (alternating proximal/distal end configuration as discussed hereinabove, such as in FIG. 1 and FIG. 7D), terminating at base plate 534. Owing to the triple alternating blade width/angles (side wall angles) of blades 530 the liquid is moved in a circular rotational with oscillation pattern during mixing.

Figure 7F:
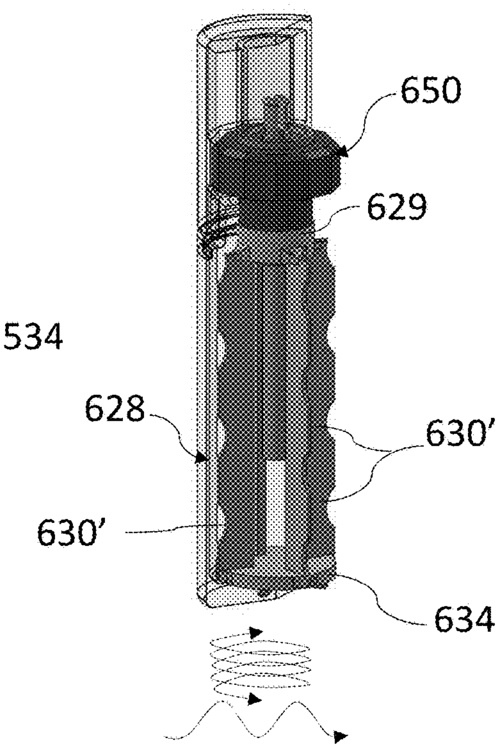
FIG. 7F illustrates an embodiment of the mixing element.

FIG. 7F illustrates a quad notched paddle with cam. Mixing element 628 is formed having a collar 629 with three/quad mixing blades 630 extending longitudinally therefrom. Collar 629 is formed as a cylindrical ring or band and is appointed for attachment in the assembly discussed hereinabove, with rotational end cap assembly 650. Mixing blades 630 are formed as elongated angled blades with alternating angles/blade widths (alternating proximal/distal end configuration as discussed hereinabove, such as in FIG. 1 and FIG. 7D) with one or more notches 630', terminating at base plate 634. Owing to the triple alternating blade width/angles (side wall angles) of blades 630 and notches 630' the liquid is moved in a spiral rotational oscillation pattern during mixing.

Figure 8:
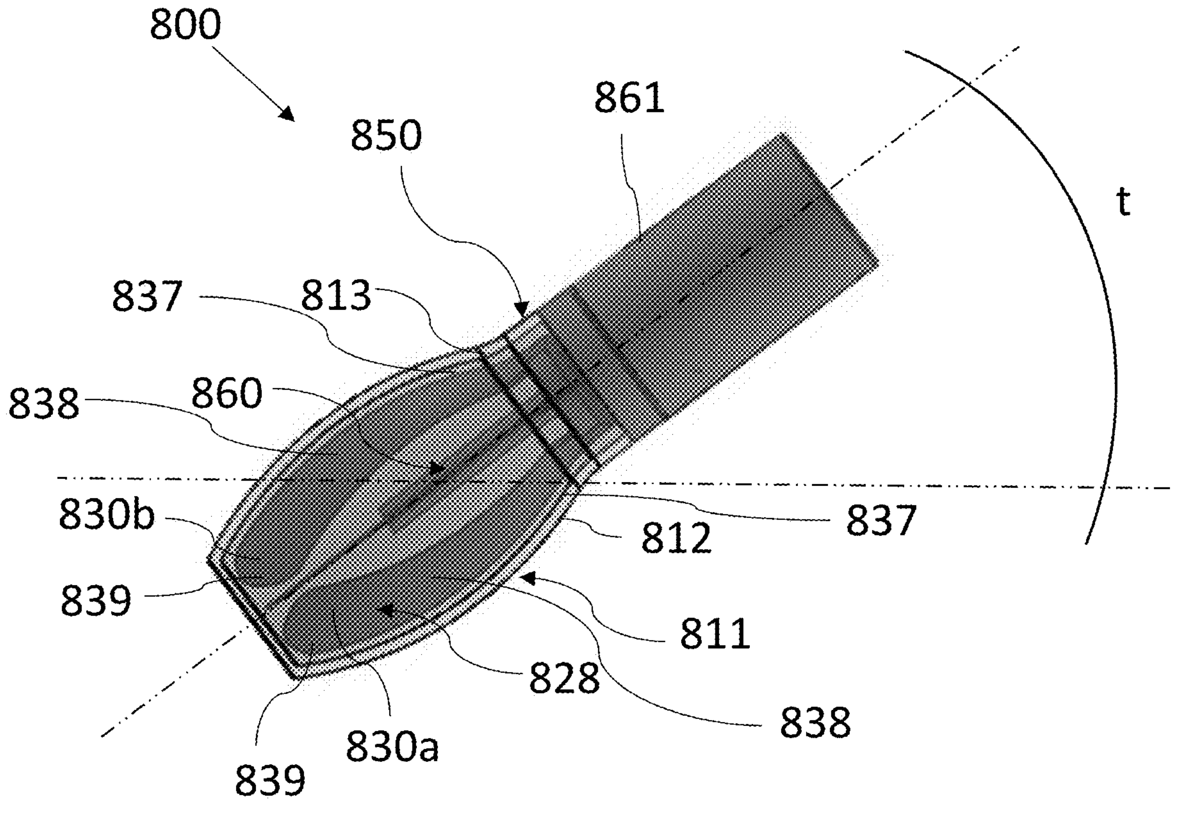
FIG. 8 illustrates an embodiment of another rotational mixing element, showing mixing angle orientation.

FIG. 8 illustrates an embodiment of another rotational mixing element, showing mixing at an angle, shown generally at 800. As set forth above, the mixing pack 800 generally includes a container 811 for holding a multi-phase cosmetic composition, a mixing element 828 for mixing the multi-phase cosmetic composition, and an applicator 860 for applying the temporarily miscible components of the multi-phase cosmetic composition to a keratinous material. Container 811 may be any suitable shape, size, configuration, material, etc., to appropriately hold a desired multi-phase cosmetic composition. In the depicted embodiment, the container 811 includes a substantially cylinder glass or plastic rounded or curved/bulbous container body 812, having a first end 813 attached to an end cap assembly 850 structured as discussed hereinabove with rotational inner drive shaft for rotational movement of the mixing element 828. The stem of the applicator 860 extends from an interior portion of a cap/applicator top 861 that is removably securable to the end cap assembly 850 on the container 811 for sealing and enclosing the cosmetic composition therein.

In this embodiment, the mixing element 828 has a plurality of mixing blades or paddles 830*a*, 830*b*, 830*n*+1, attached to a collar 829 extending longitudinally therefrom. Mixing blades 830*a*, 830*b* are herein shown as curved or arched to configure to the shape of the curved or bulbous bottle/container 811. Further, in this embodiment, the mixing blades 830*a*, 830*b* have a wider paddle like distal end 839 as compared to the proximal end 837, with arched or curved main body 838 proximal to the walls of the container 811. The mixing blades 830*a*, 830*b* do not terminate at a base plate but are free ends. In operation, a user angles the bottle 811 such as represented by angle t for ease of mixing in the natural position. The angle plus profile of the bottle/container 811 in operation with the curved mixing blades 830*a*, 830*b* (preferably having four mixing blades) keeps the formula together at the base of the bottle/container 811 to maximize mixing of the formula during rotational mixing.

Figure 9:
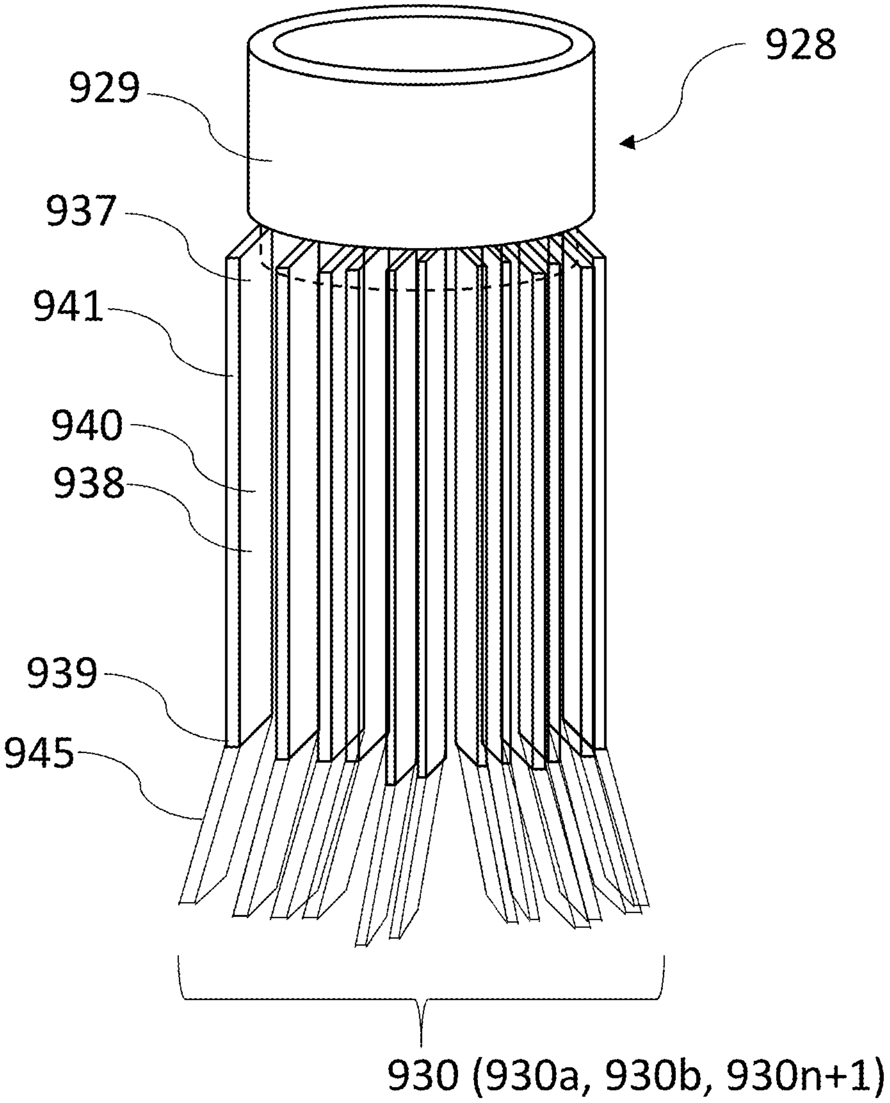
FIG. 9 illustrate an exemplary embodiment of a mixing element suitable for mixing a multi-phase cosmetic composition contained within a container as discussed hereinabove.

FIG. 9 illustrate an exemplary embodiment of a mixing element 928 suitable for mixing a multi-phase cosmetic composition contained within a container as discussed hereinabove in FIGS. 1-5. Mixing element 928 is formed having a collar 929 with plurality of mixing blade 930 (930*a*, 930*b*, 930*n*+1) extending longitudinally therefrom. Collar 929 is formed as a cylindrical ring or band and is appointed for attachment in the assembly discussed hereinabove, with the described rotational end cap assembly. Mixing blades 930 are formed as an elongated blades having a substantially straight proximal end 937, blade body 938 and distal end 939, face walls 940 and shallow substantially perpendicular side walls 941. Proximal end 937 is attached along a portion of perpendicular side walls 941 and extends vertically or longitudinally from collar 929 with face walls 940 being substantially perpendicular to collar 929. Distal end 939 terminates at angle end portions 945. During rotation the plurality of angled mixing blades 930 with angle end portions 945 rapidly mix the multi-phase cosmetic composition.

Figure 10A:
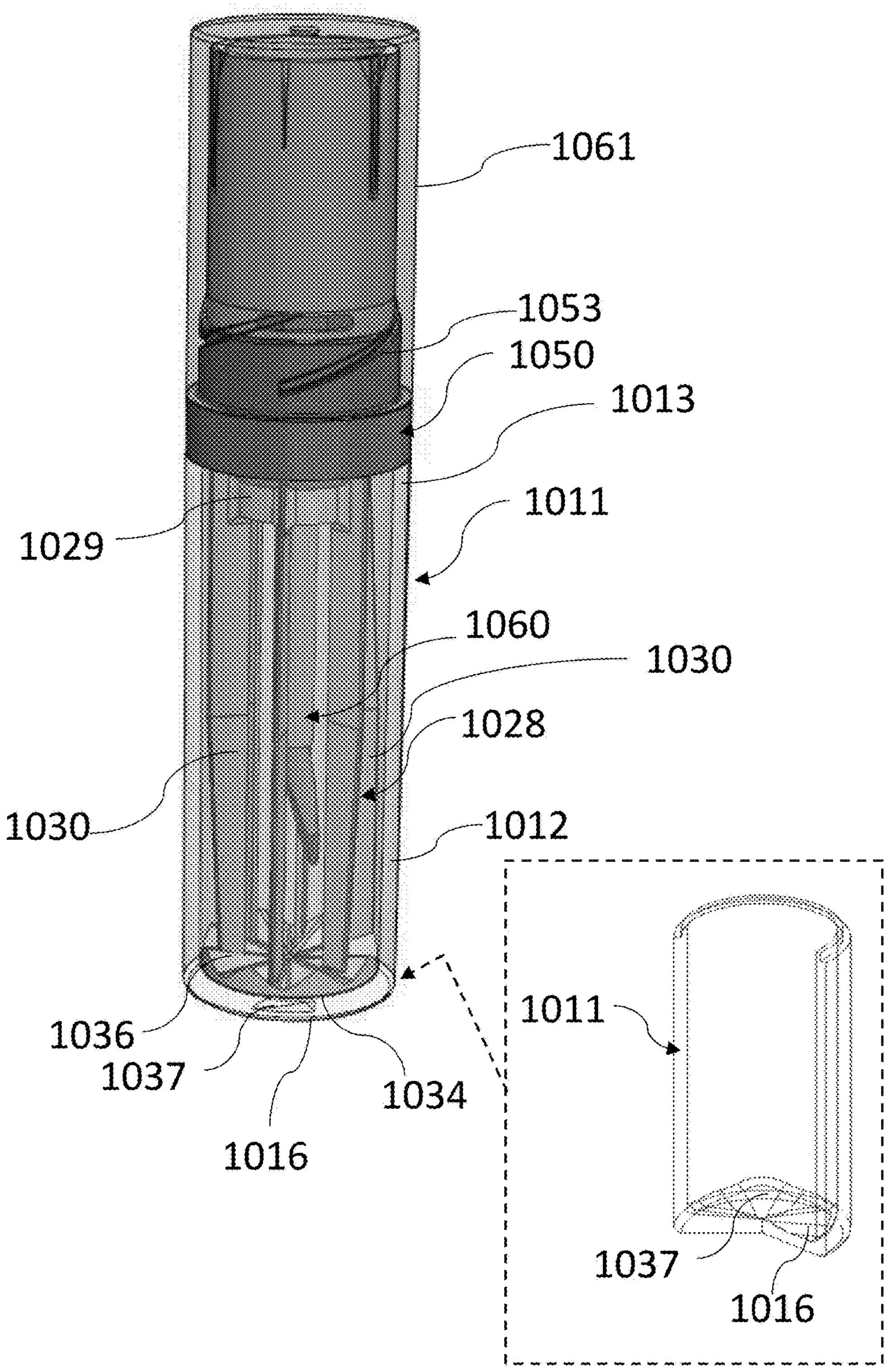
FIG. 10A illustrates an exemplary embodiment of a mixing blade with blade cams or ribbons.
Figure 10B:
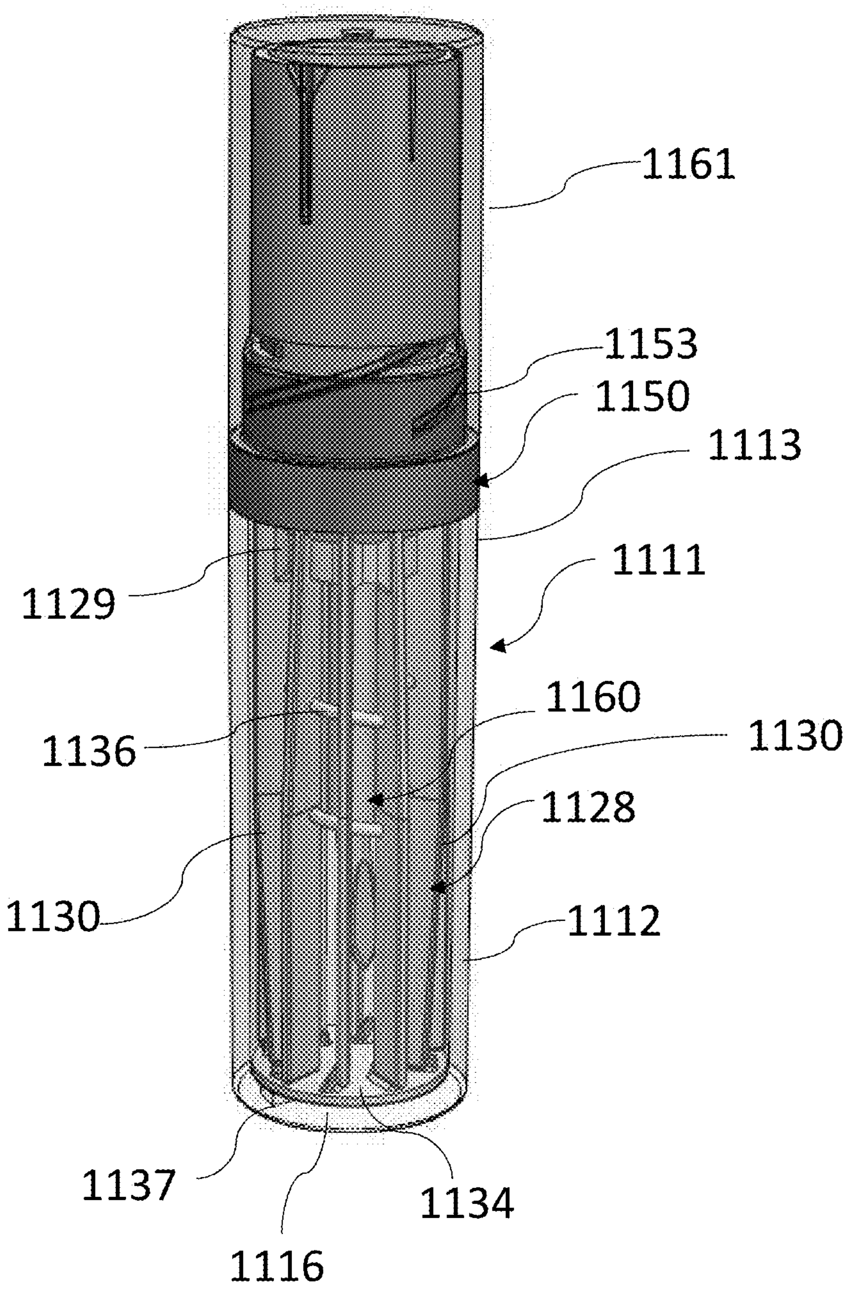
FIG. 10B illustrates an exemplary embodiment of a mixing blade with blade cams or ribbons.

FIGS. 10A and 10B illustrate exemplary embodiments of mixing blades 1028, 1128, respectively, with blade cams or ribbons 1036, 1136, respectively. The embodiment rotating structure is similar to that discussed above in relation to FIGS. 1-5.

Referring to FIG. 10A, a container 1011 is provided holding a multi-phase cosmetic composition. Container 1011 includes a container body 1012, having a first end 1013 attached to an end cap assembly 1050 that removably connects to an applicator top/cap 1061 of an applicator 1060. End cap assembly 1050 includes a bottle shoulder having a shoulder collar 1053 and an inner cap (not shown) having a rotating inner stem/drive shaft as discussed hereinabove.

Mixing element 1028 is limited to rotational movement along a central axis of container 1011.

In the embodiment shown, mixing element 1028 is constructed having a collar 1029 having one or more mixing blades, herein shown as a plurality of mixing blades 1030 extending longitudinally therefrom with alternating blade widths and/or angled blades 1030. Mixing blades are formed terminating at a base plate 1034 having cams or ribbons 1036 for upward force, preferably molded therein for providing enhanced turbulence. Bottom wall 1016 of container 1011 preferably includes cams or projections 1037 extending there from to provide haptic sensory to the user, including for force and/or clicking sound.

Referring to FIG. 10B, a container 1111 is provided holding a multi-phase cosmetic composition. Container 1111 includes a container body 1112, having a first end 1113 attached to an end cap assembly 1150 that removably connects to an applicator top/cap 1161 of an applicator 1160. End cap assembly 1150 includes a bottle shoulder having a shoulder collar 1153 and an inner cap (not shown) having a rotating inner stem/drive shaft as discussed hereinabove. Mixing element 1128 is limited to rotational movement along a central axis of container 1111.

In the embodiment shown, mixing element 1128 is constructed having a collar 1129 having one or more mixing blades, herein shown as a plurality of mixing blades 1130 extending longitudinally therefrom with alternating blade widths and/or angled blades 1130. Mixing blades are formed terminating at a base plate 1134 having cams or ribbons or upward projections 1136 preferably molded therein for providing enhanced turbulence, as well as haptic sensory to the use, including for force and/or clicking sound. Container 1111 is provided holding a multi-phase cosmetic composition. Container 1111 includes a container body 1112, having a first end 1113 attached to an end cap assembly 1150 that removably connects to an applicator top/cap 1160 of an applicator 1160. End cap assembly 1150 includes a bottle shoulder 1151 having a shoulder collar 1153 and an inner cap (not shown) having a rotating inner stem/drive shaft as discussed hereinabove. Mixing element 1128 is limited to rotational movement along a central axis of container 1111.

Mixing element 1128 is constructed having a collar 1129 having one or more mixing blades, herein shown as a plurality of mixing blades 1130 extending longitudinally therefrom. Mixing blades are angled with alternating proximal and distal end widths and are formed terminating at a base plate 1134. One or more ribbons 1136 extend between neighboring or adjacent mixing blades 1130 for providing enhanced turbulence. Bottom wall 1116 of container 1111 preferably includes cams or projections 1137 extending there from to provide haptic sensory to the user, including for force and/or clicking sound.

Figure 11A:
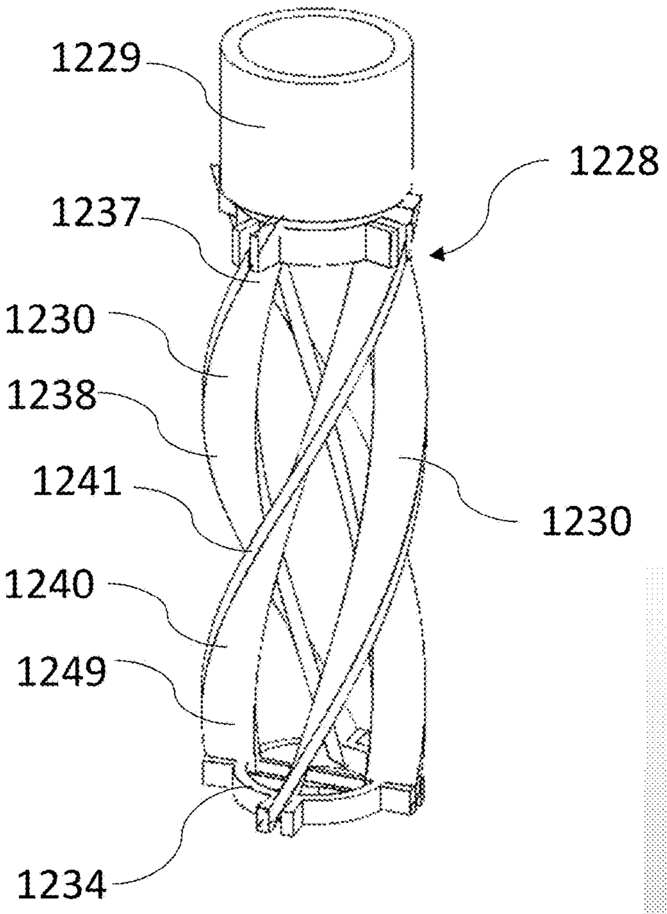
FIG. 11A illustrates an exemplary embodiment of a mixing element.
Figure 11B:
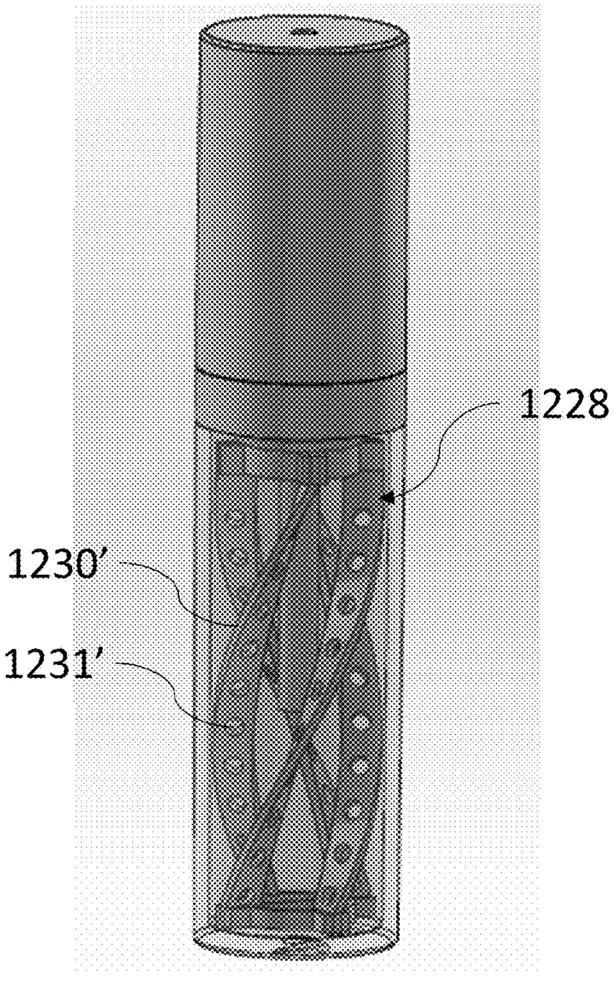
FIG. 11B illustrates an exemplary embodiment of a mixing element.

FIGS. 11A and 11B illustrate exemplary embodiments of a mixing element suitable for mixing a multi-phase cosmetic composition contained within a container as discussed hereinabove. FIG. 11A shows a mixing element 1228 suitable for mixing a multi-phase cosmetic composition contained within a container as discussed hereinabove in FIGS. 1-5. Mixing element 1228 is formed having a collar 1229 with a plurality of mixing blades 1230 having a helical shape, with one or more curved sections 1230' extending longitudinally therefrom. Collar 1229 is formed as a cylindrical ring or band and is appointed for attachment in the assembly discussed hereinabove, with the described rotational end cap assembly. Mixing blades 1230 are formed as an elongated helical blades having a proximal end 1237, blade body 1238 and distal end 1239, face walls 1240 and shallow substantially perpendicular side walls 1241.

Proximal end 1237 is attached along a portion of perpendicular side walls 1241 and extends vertically or longitudinally from collar 1229 with face walls 1240 being substantially perpendicular to collar 1229. Distal end 1239 terminates at base plate 1234. Alternatively, distal end 1239 do not terminate at a base plate 1234 but instead intersect forming a base bottom (not shown). During rotation the plurality of helical mixing blades 1230 rapidly mix the multi-phase cosmetic composition. FIG. 11B shows a mixing element 1230' as discussed in FIG. 11A including helical blades 1230' with a plurality of apertures 1231' integrated therein.

Figure 12:
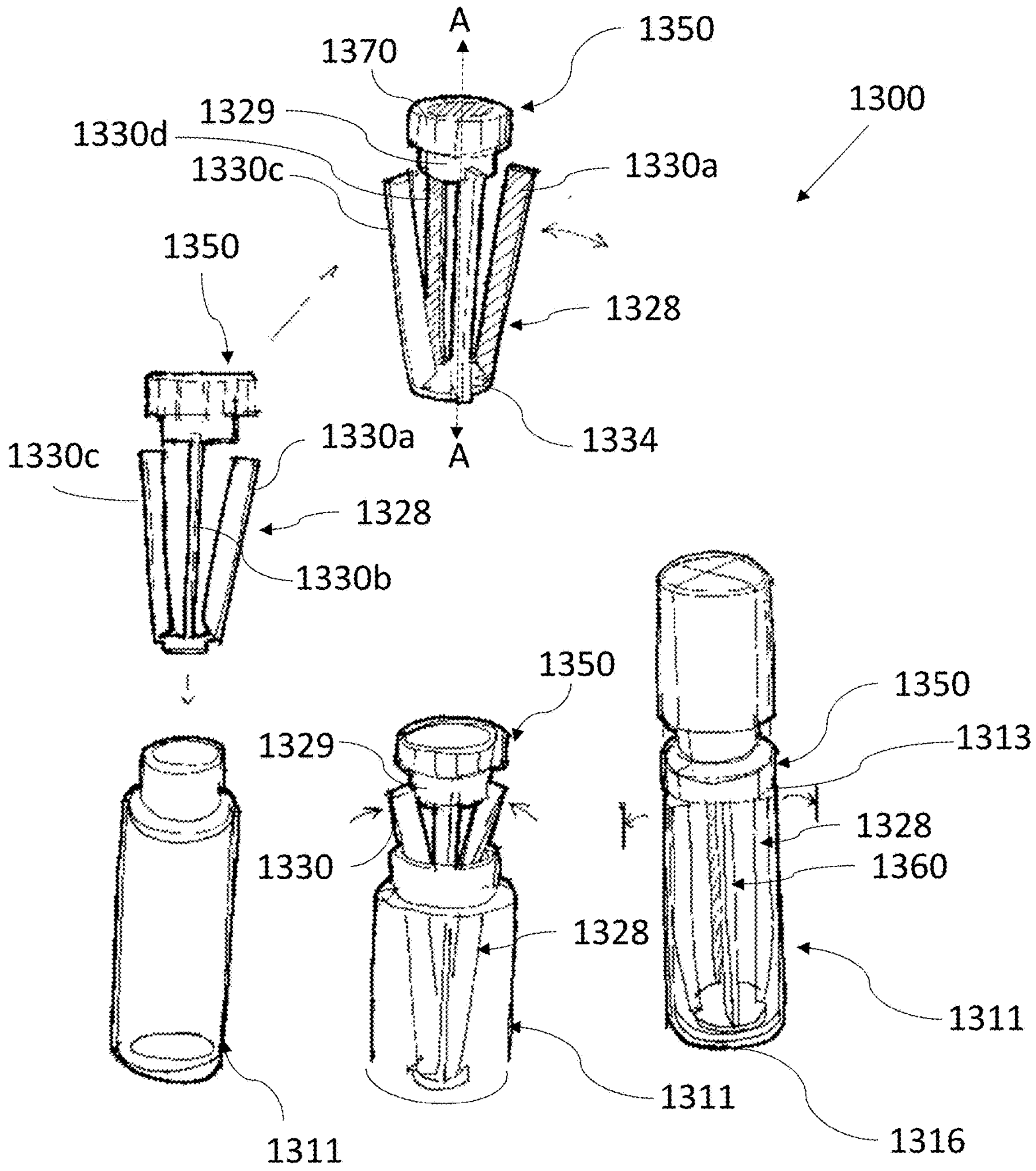
FIG. 12 illustrates an embodiment of the mixing blade assembly.

FIG. 12 illustrates an embodiment of the mixing blade assembly, shown generally at 1300. Mixing pack 1300 is suitable for mixing a multi-phase cosmetic composition (not shown) so that the immiscible components are temporarily miscible. The mixing pack 1310 generally includes a container 1311 for holding a multi-phase cosmetic composition, a mixing element 1328 for mixing the multi-phase cosmetic composition, and an applicator 1360 for applying the temporarily miscible components of the multi-phase cosmetic composition to a keratinous material.

Container 1311 may be any suitable shape, size, configuration, material, etc., to appropriately hold a desired multi-phase cosmetic composition. In the depicted embodiment, the container 1311 includes a substantially cylinder glass or plastic container body, having a first end 1313 forming a top of container 1311 and a second end 1316 that is enclosed to form the bottom of container 1311. The first end 1313 is attached to an end cap assembly 1350 that may be press-fit or otherwise secured to container 1311 in any suitable manner.

End cap assembly 1350 includes structures discussed hereinabove, including a bottle shoulder having a shoulder collar which in turn is attached to a secondary shoulder collar, in a stacked cylindrical arrangement with an aligned central opening for pass through of applicator 1360, an inner cap having a rotating inner stem/drive shaft and O-ring seal and includes rotating inner stem/drive shaft rotated by way of drive collar 1370 rotating mixing element 1328.

An exemplary mixing element 1328 suitable for mixing the multi-phase cosmetic composition is contained within the container 1311. Mixing element 1328 comprises one or more mixing blades 1330*a*, 1330*c* attached to a bottom base plate 1334 and fanning out therefrom alternately arranged with one or more mixing blades 1330*b*, 1330*d* attached to a top collar 1329 and the bottom base plate 1334. The mixing element 1328 is in mechanical communication with a drive shaft of the end cap assembly operable to substantially rotate the one or more mixing blades around the central axis, herein shown as A-A.

Mixing element 1328 is attached to end cap assembly 1350. Mixing blades 1330 fan out and are compressed when placed in bottle/container 1311 and expand outward within container 1311 near the top/first end 1313. Mixing blades 1330*a*, 1330*c* flex and fan outward during rotational mixing. seeing the mixing paddles, and application of the formula. Bias movement may be provided. What is more, the container/mixing pack assembly may be formed as an oval shaped pack; square shaped, elliptical, etc., wherein the fans creating undulation, bias movement into the shape, i.e., corners, etc., of the container/bottle to move liquid thoroughly within the container.

Figure 13:
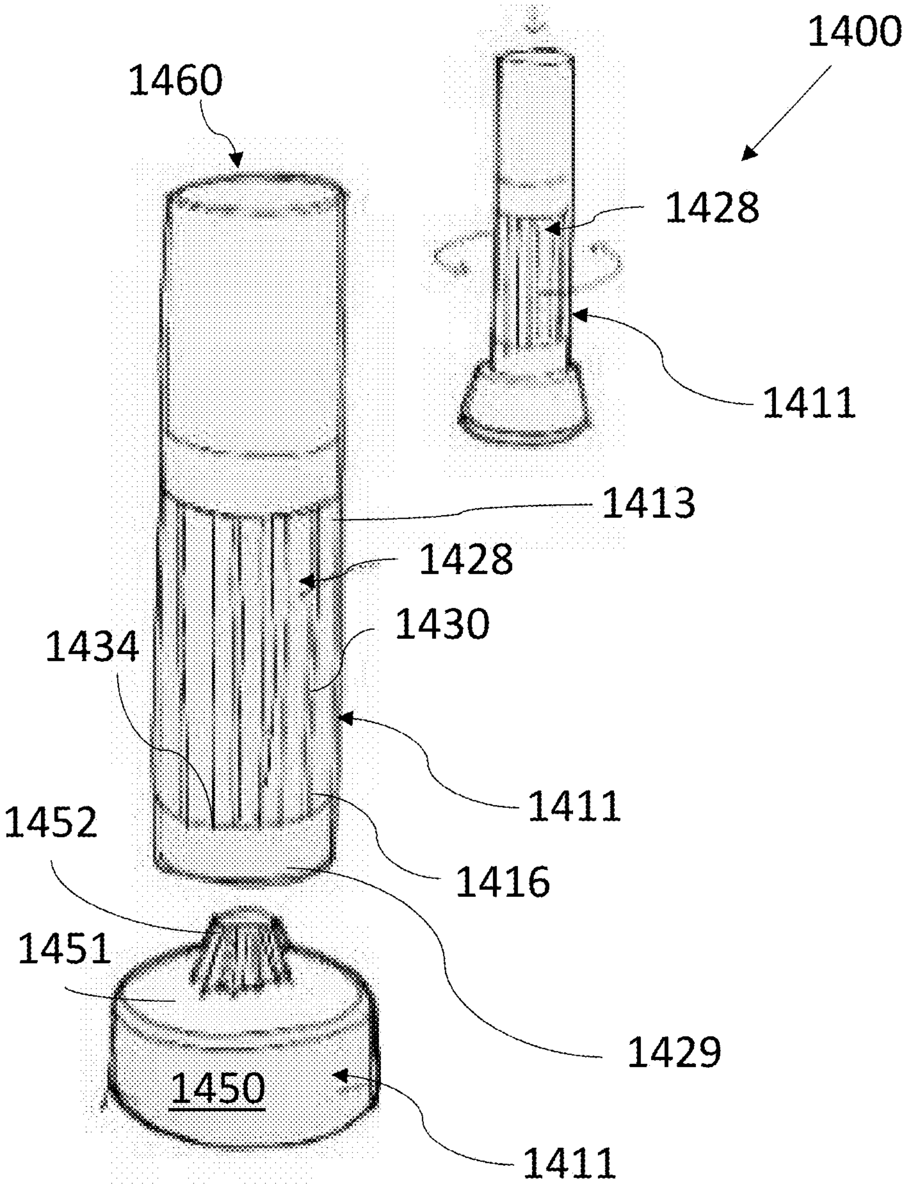
FIG. 13 illustrates an exemplary embodiment of a mixing blade assembly with a motorized plate.

FIG. 13 illustrates an embodiment of the mixing blade assembly, shown generally at 1400. The mixing pack generally includes a container 1411, a mixing element 1428 for mixing a multi-phase cosmetic composition, and an applicator 1460 for applying the temporarily miscible components of the multi-phase cosmetic composition to a keratinous material. Container 1411 may be any suitable shape, size, configuration, material, etc., to appropriately hold a desired multi-phase cosmetic composition. In the depicted embodiment, the container 1411 includes a substantially cylinder glass or plastic container body, having a first end 1413 (top) and a second end 1416 that is enclosed to form the bottom of container 1411.

Second end 1416 includes an aperture with gear grooves extending to a base collar 1429 with a rotatable base plate 1434 with mixing blades 1430 of mixing element 1428 thereto attached. Mixing blades 1430 extend from collar 1429 upward toward the first end 1413 of container 1411. A motor 1450 (external and/or internal) is provided having power means, such as battery operation, and a top plate 1451 with a rotatable gear shaft 1452 adapted to be received within aperture with gear grooves of second end 1426. Alternatively, the motor 1450 may be internally integrated within the collar 1429 and/or bottle/container 1411. Upon activation of the external motor 1450 mixing element 1428 rotates to mix the composition. Alternatively, a magnet may be used in place of the gear shaft 1452 for magnetically propelled movement of a ferrous mixing element.

Figure 14:
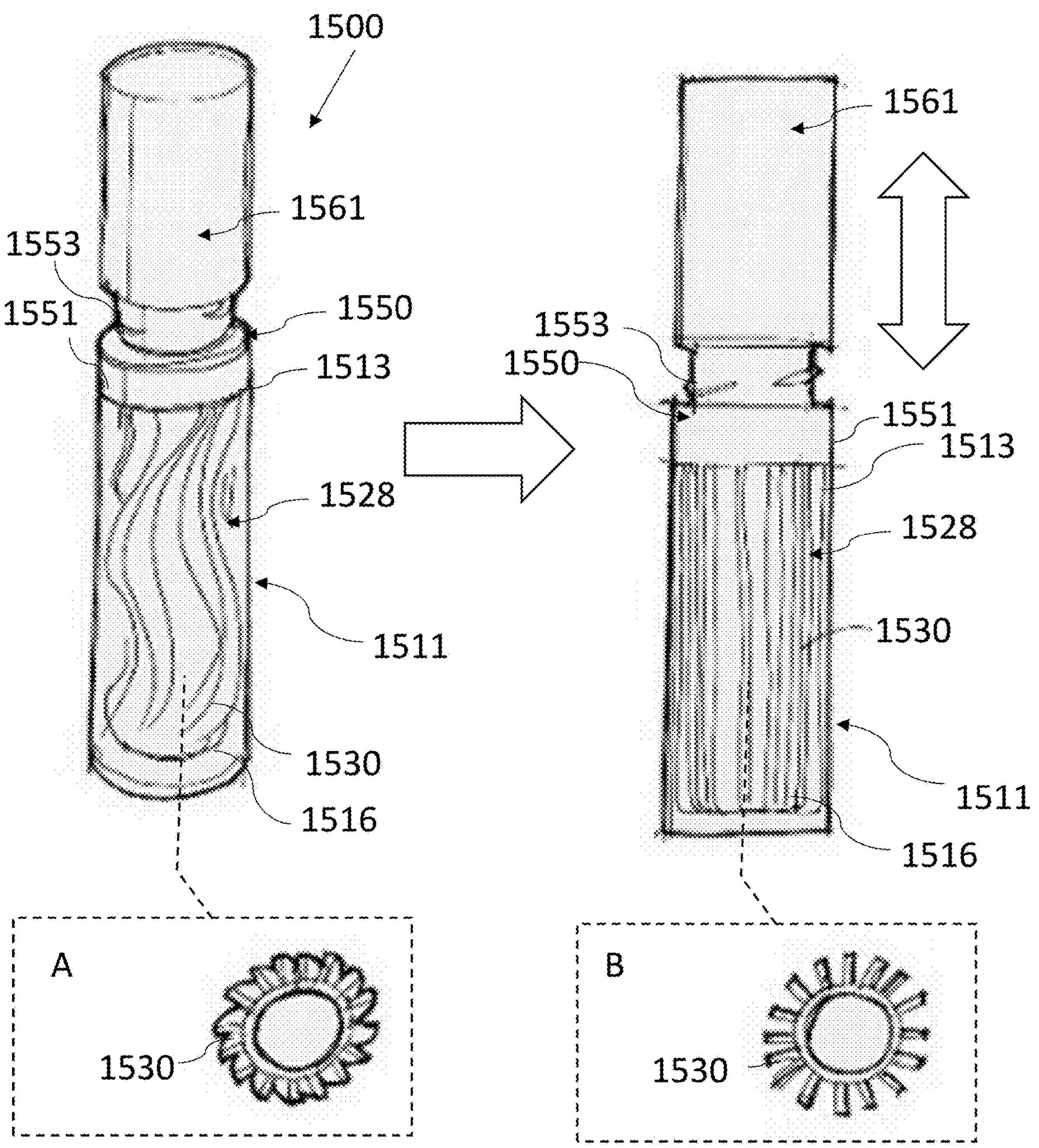
FIG. 14 depicts an exemplary embodiment of a mixing pack suitable for mixing a multi-phase cosmetic composition wherein the assembly includes a mixing element that can be compressed causing a deformation of mixing blades.

FIG. 14 depicts an exemplary embodiment of a mixing pack suitable for mixing a multi-phase cosmetic composition (not shown) wherein the assembly includes a mixing element (end cap assembly 1550) which can be compressed causing a deformation of mixing blades 1530 which springs back into place. The mixing pack 1500 generally includes a container 1511 for holding a multi-phase cosmetic composition, a mixing element 1528 for mixing the multi-phase cosmetic composition, and an applicator having an applicator top 1561 for applying the temporarily miscible components of the multi-phase cosmetic composition to a keratinous material. The container 1524 includes a substantially cylindrically shaped container body having a first (or top) open end 1513 that receives an end cap assembly 1550 secured by threading, snap-fit, or otherwise, and enclosed bottom end/second end 1516. It should be appreciated that the container 1511 may instead be comprised of a container body that is integrally formed with the end cap assembly 1550.

End cap assembly 1550 encloses and seals the first, top open end of the container and provides an interface between the applicator 1560 and the interior of the container 1511. In that regard, the end cap assembly 1550 includes a central opening extending from a top surface to a bottom surface of the end cap assembly 1550. The central opening is sized to allow the applicator to pass there through. The end cap assembly 1550 may include an internal wiping assembly that helps wipe excess cosmetic composition from the applicator tip as it is removed from the container. Any suitable internal wiping assembly for the intended application may be used. End cap assembly 1550 includes a bottle shoulder 1551 having a shoulder collar 1553 for removable attachment to applicator top 1561. An inner cap (not shown) is provided having a rotating inner stem/drive shaft and O-ring seal surrounding an inner cap opening for pass-through of the applicator.

At least a portion of inner cap is secured within bottle shoulder 1551 and includes rotating inner stem/drive shaft including grooves or tracts running horizontal along the peripheral that receives mating tabs therein of a drive collar so that the drive collar attached to applicator top 1561 can be pumped up and down, thereby compressing mix blades as shown at A and depressing mixing blades as shown at B of mixing element 1528. Mixing blades 1530 are preferably composed of a flexible polymeric material or silicon material for compression and elongation/depression attached to a collar (not shown) which in turn is attached to the drive shaft 1566 to pull mixing blades 1530 up and down to mix the composition, causing mixing blades 1530 to expand or fold outward causing the mixing blades themselves to deform, fold and/or rotate along the collar, and/or contract and fold inward causing semi-rotation. In the subject embodiment, the mixing blades deform and/or crush upon neighboring mixing blades and reverse spring when force, i.e., cap assembly applying downward force, is released. When the force is released, the mixing blades fan out via rotation along the collar, causing compression movement, coil and/or rotational movement. Alternative to the driver, the end cap assembly may have a piston configuration, cam or ratchet may be used to move upward and downward force against the mixing element to deform, coil or fold the mixing blades, and to conversely provide release for allowing the mixing blades to spring back into place and move and/or mix the multi-phase liquid.

Figure 15:
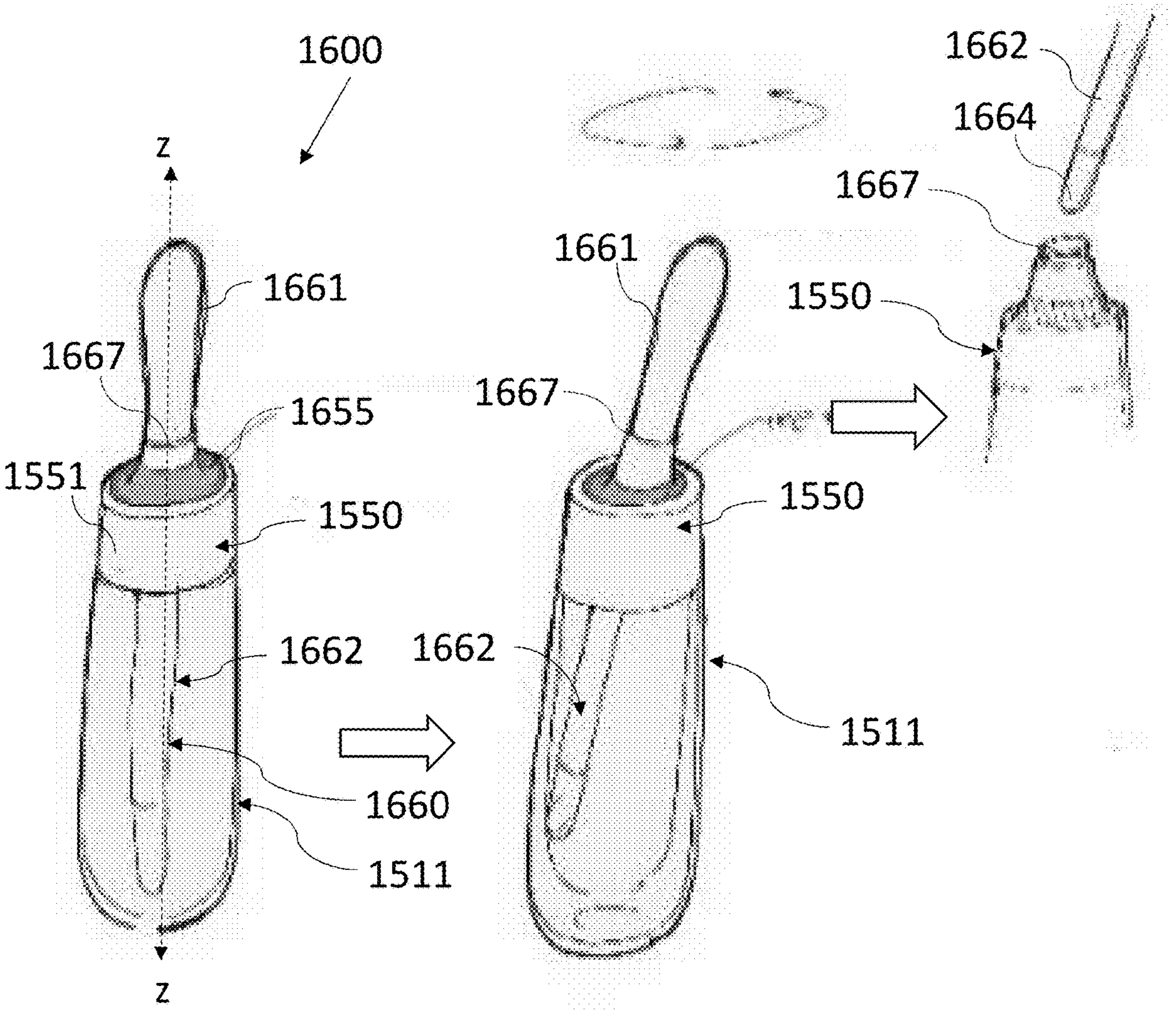
FIG. 15 depicts an exemplary embodiment of a mixing pack suitable for mixing a multi-phase cosmetic composition (not shown) wherein the assembly includes a flexible cap assembly integral to the mixing of the contents.

FIG. 15 depicts an exemplary embodiment of a mixing pack suitable for mixing a multi-phase cosmetic composition (not shown) wherein the assembly Includes a bi-injected collar assembly integral to the mixing of the contents. In the embodiment shown, the mixing pack 1600 generally includes a container 1611 for holding a multi-phase cosmetic composition, a mixing element herein formed as applicator stem 1662 for mixing the multi-phase cosmetic composition, and an applicator 1660 having an applicator top 1661 for applying the temporarily miscible components of the multi-phase cosmetic composition to a keratinous material. The container 1611 has a first (or top) open end that receives an end cap assembly 1650 secured by threading, snap-fit, or otherwise, and enclosed bottom end/second end.

Mixing element is formed by way of an applicator stem 1662 of applicator 1660 and is sealing received within a top flexible wall 1655 of end cap assembly 1650. End cap assembly 1650 encloses and seals the first, top open end of the container and provides an interface between the applicator 1660 and the interior of the container 1611. The end cap assembly 1650 may include an internal wiping assembly that helps wipe excess cosmetic composition from the applicator tip as it is removed from the container. Any suitable internal wiping assembly for the intended application may be used.

End cap assembly 1650 is preferably composed of bi-injection molding and includes shoulder 1651 secured on bottle top/first end 1613 and flexible wall 1655. Flexible wall 1655 includes an aperture 1667 with a seal that receives stem 1662 of applicator 1660. In this embodiment, applicator top 1661 is grasped and the bottle/or container 1611 turned or angled, and the applicator top 1661 and container 1611 shaken rapidly back and forth, wherein applicator stem 1662 and the tip thereof, 1664, rapidly move back and forth and rotationally along a centerline z-z preferably contacting side walls of container 1611 to make a clicking or haptic sound. When the composition has been adequately mixed, the user simply removes the applicator stem 1662 with applicator top 1661 from top flexible wall 1655 and immediately applies the mixed solution.

Figure 16:
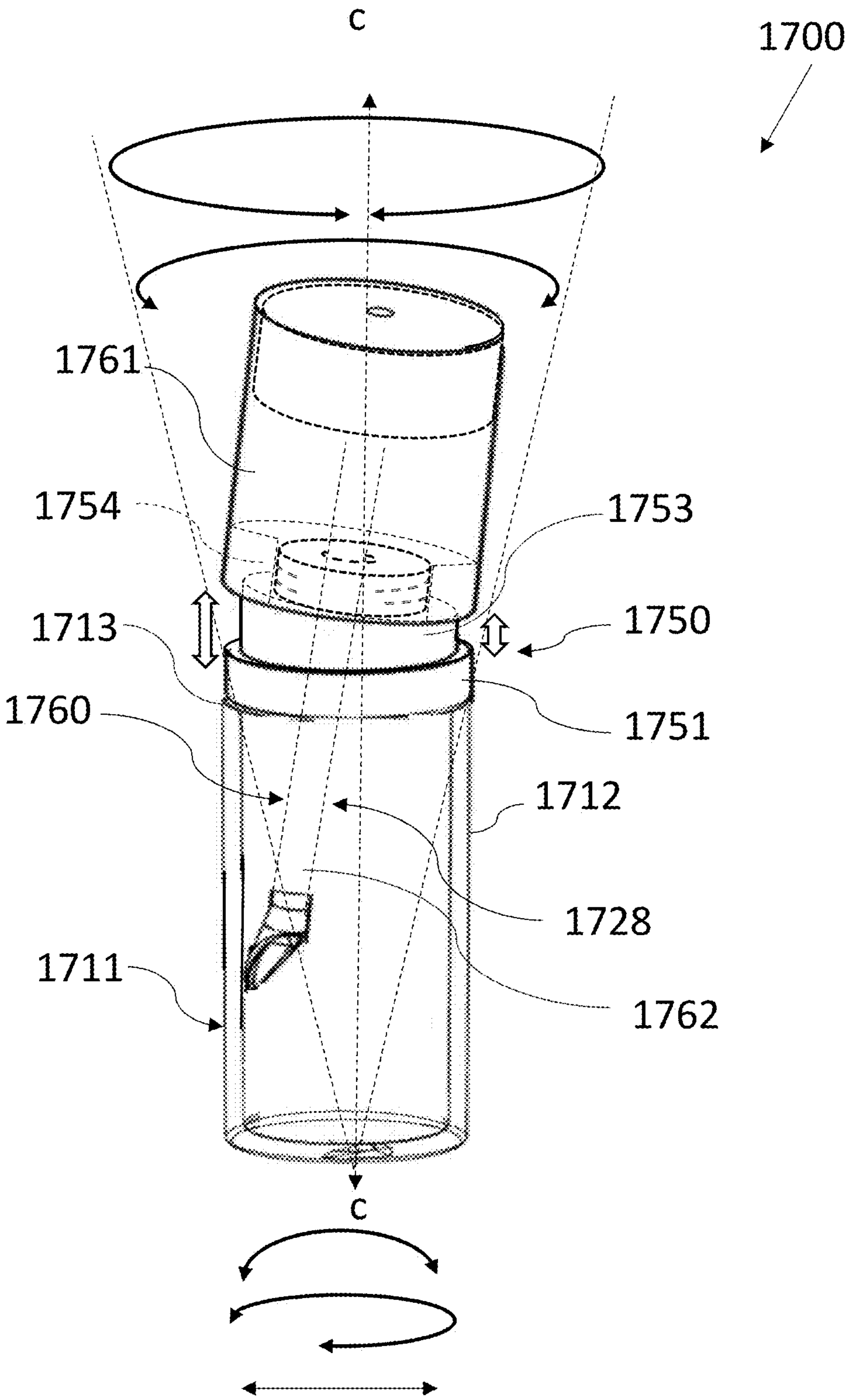
FIG. 16 depicts an exemplary embodiment of a mixing pack suitable for mixing a multi-phase cosmetic composition (not shown) wherein the assembly includes a flexible cap assembly integral to the mixing of the contents.

FIG. 16 depicts an exemplary embodiment of a mixing pack suitable for mixing a multi-phase cosmetic composition (not shown) wherein the assembly includes a flexible collar assembly integral to the mixing of the contents, shown generally at 1700. The mixing pack assembly 1700 comprise a flexible collar assembly 1750 for removable attachment to a mixing element 1728, which in this embodiment is formed by an applicator stem 1762 of an applicator 1760 for applying temporarily miscible components of the multi-phase cosmetic composition to a keratinous material.

Movement is actuated by moving the applicator stem 1762 rotationally (including rotational degrees "r"; wherein r≤360 degrees; i.e., full rotation about 360 degrees, semi-rotation <360 degrees), and/or laterally back and forth, striking side walls/body 1712 of bottle 1711. Bottle/container 1711 has a first (or top) open end 1713 that receives flexible cap assembly 1750.

Flexible cap assembly 1750 is constructed having a connection collar 1751, preferably being composed of a rigid material, that is secured by threading, snap-fit, or otherwise, to first open end 1713. Connection collar 1751 may be removable form bottle/container 1711, or may be fixedly attached to bottle/container 1711. Proximal, adjacent, and stacked-upon connection collar 1751 is a flexible collar 1753. Flexible collar 1753 may extend downward through connection collar 1751 forming a seal lip against a top rim of the open end 1713 for both sealing bottle/container 1711, and/or for securement of flexible collar 1753. Alternatively, flexible collar 1753 and connection collar 1751 may be formed as a single piece, by way of bi-injection molding. Flexible collar 1753 preferably a smaller diameter than connection collar 1751, and provides flexure along both the rotational plan and lateral plan from center axis c as a user moves the applicator top/cap 1761 back and forth, rotationally, and even pulling for further movement longitudinally. Flexible cap assembly 1750 further comprises a secondary connection collar 1754, preferably rigid, that includes threads or grooves or snap fit for removably attached to applicator top/cap 1761. The flexible cap assembly 1750 may include a wiping assembly. Flexible cap assembly 1750 is preferably formed by bi-injection molding.

After a user grasps applicator top/cap 1761, optionally angling and/or turning bottle/container 1711 on its side or up in the air, the user can then move the applicator top/cap 1761 rapidly, and visa via the mixing element/applicator stem 1762, at any degree from the center axis c for rotational and/or lateral and some longitudinal movement. The applicator stem 1762 and the tip thereof, 1764, rapidly move back and forth laterally and/or rotationally along centerline c-c preferably contacting side walls of container 1711 to make a clicking or haptic sound. Omni-directional movement is provided along centerline c-c, which is multi-accessible by the user depending on the movement of the applicator top/cap and visa vie the applicator mixing element 1728. When the composition has been adequately mixed, the user simply removes the applicator stem 1762 with applicator top 1761 and immediately applies the mixed solution.

The flexible collar assembly may be molded as one part/or as an assembly. The flexible collar assembly may be formed as a universal joint and/or ball and socket arrangement guided by a fixed collar.

It should be appreciated that any other suitable container body, caps, and applicator may be used for the desired application. For instance, the container may be configured to suit the intended use, for example, lip gloss, foundation, concealer, lacquer, etc.

It should also be appreciated that certain features of each embodiment may be eliminated or replaced with other features shown in described in other embodiments. For instance, in some embodiments, the stem and applicator tip may be removed. Such an embodiment may be suitable for applications such as foundation, lotion, etc., where application is done with a user's finger tips, a cotton swab, etc. Thus, the claimed subject matter is not limited to the mixing assemblies, actuator assemblies, applicators, or the precise mixing pack embodiments disclosed herein.

The mixing packs described above may also be comprised of certain materials, surface treatments, surface features, coatings, etc., to improve the interaction of the mixing pack with the multi-phase cosmetic composition. For instance, at least a portion of the mixing elements may be treated with a suitable material that increases wetting of an aqueous phase of the multi-phase cosmetic composition on the surface of the mixing element. In one embodiment, one or more surfaces of the mixing element may be comprised of at least one hydrophilic or a superhydrophilic surface. The mixing element may also be treated to increase wetting of a silicone phase of the multi-phase cosmetic composition on the surface of the mixing element. For instance, in an embodiment, one or more surfaces of the mixing elements may be comprised of at least one hydrophobic or superhydrophobic surface.

The wettability of a region can be determined using various technologies and methodologies including contact angle methods, the Goniometer method, the Whilemy method, or the Sessile drop technique. Wetting is a process by which a liquid interacts with a solid. Wettability (the degree of wetting) is determined by a force balance between adhesive and cohesive force and is often characterized by a contact angle. The contact angle is the angle made by the intersection of the liquid/solid interface and the liquid/air interface. Alternatively, it is the angle between a solid sample's surface and the tangent of a droplet's ovate shape at the edge of the droplet. Contact angle measurements provide a measure of interfacial energies and conveys direct information regarding how hydrophilic or hydrophobic a surface is. For example, superhydrophilic surfaces have contact angles less than about 5°, hydrophilic surfaces have contact angles less than about 90°, hydrophobic surfaces have contact angles greater than about 90°, and superhydrophobic surfaces have contact angles greater than about 150°. (see, e.g., U.S. Publication No 2013/0131575, entitled "Systems, Devices, and Methods Including Infection-Fighting and Monitoring Shunts," the disclosure of which is hereby incorporated by reference herein in its entirety).

As a specific example, the mixing elements may be treated with one or more hydrophilic coatings, including polyvinylpyrolidone (PVP), polyurethanes, polyacrylic acid (PAA), polyethylene oxide (PEO), and/or polysaccharides. In the alternative or in addition thereto, the mixing elements may be treated to increase the surface energy of the mixing element, such as with a plasma treatment. In another example, the mixing element may be treated with one or more hydrophobic or superhydrophobic coatings such as manganese oxide polystyrene ($MnO_2$/PS) nano-composite, zinc oxide polystyrene (ZnO/PS) nanocomposite, precipitated calcium carbonate, carbon nano-tube structures, and/or silica nano-coating. Additional non-limiting examples of materials that affect wettability of a surface include, but are not limited to, amphoteric surfactants, anionic surfactants, cationic surfactants, non-ionic surfactants, and the like.

In the alternative or in addition thereto, the mixing elements may comprise one or more nanostructures, microstructures, hierarchical structures, and the like that affect wettability of a surface. Non-limiting examples of nanostructures, microstructures, hierarchical structures, and the like include nanopatterned, micropatterned, and the like polymeric coatings. Specific examples include patterned silicon surface, perfluorodecyltriethyoxysilane (PFDTES) coatings, poly (methyl methacrylate) (PMMA) patterned structures, polystyrene (PS) (hydrophobic) patterned structures, and the like.

The above-noted treatments may be applied to any suitable portion of the mixing element. For instance, if a mixing element includes more than one surface, the first surface may be treated with a hydrophilic coating or similar, and the second surface may be treated with a hydrophobic coating or similar. In another alternative configuration, the mixing element may be formed from a hydrophilic material or similar, and a hydrophobic material or coating may be overmolded or treated on one surface of the mixing element. In such configurations, the mixing element would have at least two different surface properties.

It should also be appreciated that the surface properties of the mixing element may be defined in any suitable manner. For instance, the mixing element itself may be made from a hydrophilic material or hydrophobic material. In the alternative, the mixing element may be made from any suitable material, and one or more surfaces of the mixing element may be treated with a hydrophilic material or hydrophobic material. Moreover, the mixing element may be treated, coated, sprayed, etc., with a suitable material in any suitable manner. In addition, the mixing element may be textured or patterned in a suitable manner.

The detailed description set forth above in connection with the appended drawings is intended as a description of exemplary embodiments of mixing packs having mixing elements for use with containers containing a multi-phase cosmetic composition and are not intended to represent the only embodiments. The representative embodiments described in this disclosure are provided merely as an example or illustration and are not intended to be exhaustive or to limit the claimed subject matter to the precise forms disclosed.

In the foregoing description, numerous specific details are set forth to provide a thorough understanding of the exemplary embodiments of the present disclosure. It will be apparent to one skilled in the art, however, that the exemplary embodiments of the present disclosure may be practiced without some or all of the specific details. In some instances, well-known process steps or features have not been described in detail in order not to unnecessarily obscure various aspects of the present disclosure. Further, it will be appreciated that the exemplary embodiments of the present disclosure may employ any combination of features described herein.

The present disclosure may also include references to directions, such as “forward,” “rearward,” “front,” “back,” “upward,” “downward,” “lateral,” “medial,” “in,” “out,” “extended,” “advanced,” “retracted,” “vertical,” “horizontal,” “proximal,” “distal,” “central,” etc. These references, and other similar references in the present disclosure, are only to assist in helping describe and understand the particular embodiment and are not intended to limit the present disclosure to these directions or locations.

The present disclosure may also reference quantities and numbers. Unless specifically stated, such quantities and numbers are not to be considered restrictive, but exemplary of the possible quantities or numbers associated with the present disclosure. Also, in this regard, the present disclosure may use the term “plurality” to reference a quantity or number. In this regard, the term “plurality” is meant to be any number that is more than one, for example, two, three, four, five, etc. In an embodiment, “about,” “approximately,” etc., means plus or minus 5% of the stated value.

Thus, while illustrative embodiments have been illustrated and described, it will be appreciated that various changes can be made therein without departing from the spirit and scope of the invention.

The embodiments of the invention in which an exclusive property or privilege is claimed are defined as follows:

1. A multi-phase cosmetic composition container, comprising:

a mechanical blender including a plurality of mixing elements disposed about an applicator received within a container reservoir that is at least partially filled with a multi-phase cosmetic composition;

a torque component operably coupled to the mechanical blender, the torque component including a rotational end cap assembly that affixes to the multi-phase cosmetic composition container and engages the mechanical blender so as to rotate or oscillate the plurality of mixing elements responsive to an applied a rotational force; and wherein the torque component comprises a planetary gear assembly.

2. The multi-phase cosmetic composition container of claim 1, wherein the torque component is configured to rotate the mixing element along a central axis for a duration and rate sufficient to mix immiscible components of a multi-phase cosmetic composition such that they are temporarily miscible, elements responsive to an applied a rotational force, without contacting the application portion of the applicator received within a container reservoir.

3. The multi-phase cosmetic composition container of claim 1, wherein the plurality of mixing elements comprises a plurality of blades, each blade having a cross-section having a regular or irregular geometric shape.

4. The multi-phase cosmetic composition container of claim 1, wherein each of the plurality of mixing elements comprises a unique cross-section.

5. The multi-phase cosmetic composition container of claim 1, wherein each of the plurality of mixing elements comprises a ribbon or helical structure.

6. The multi-phase cosmetic composition container of claim 1, wherein the planetary gear assembly includes a sun gear, a plurality of planet gears, and a ring gear.

7. The multi-phase cosmetic composition container of claim 6, wherein one or more of the plurality of planet gears is coupled to a mixing element and configured to rotate the mixing element in the presence of an applied force.

8. The multi-phase cosmetic composition container of claim 6, wherein one or more of the plurality of planet gears are coupled to a mixing element and configured to rotate the mixing elements about respective longitudinal axis.

* * * * *